Figure 3:
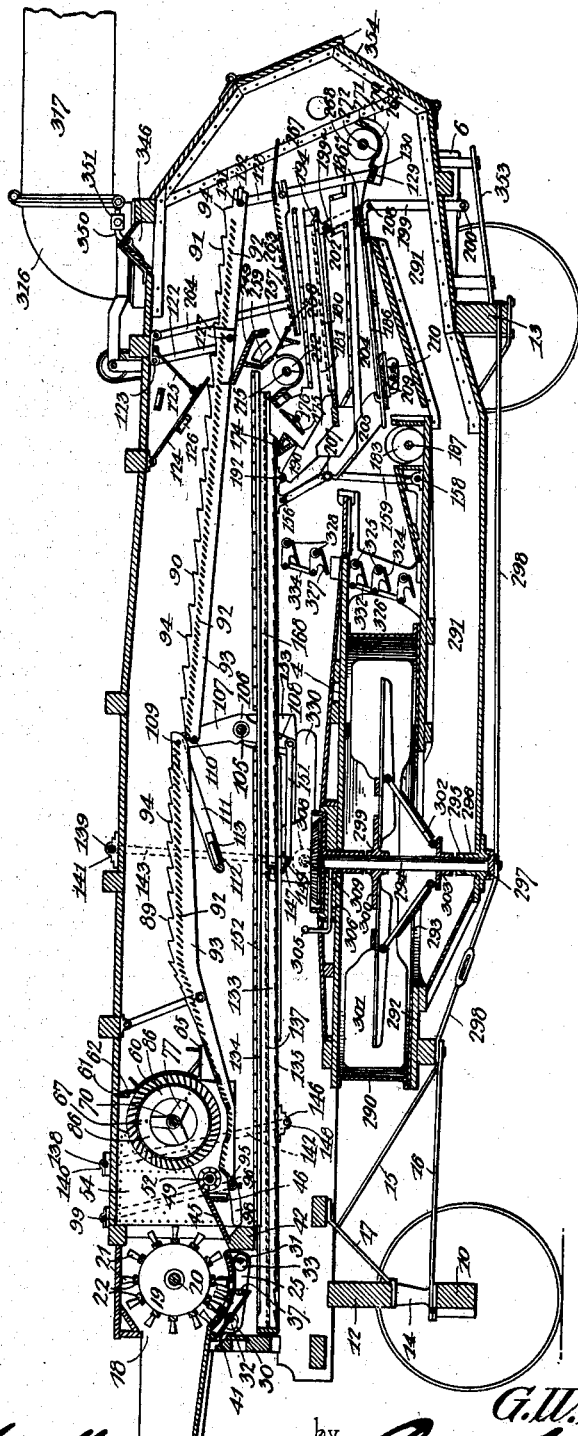

No. 757,307. PATENTED APR. 12, 1904.
G. W. HILL.
GRAIN SEPARATOR.
APPLICATION FILED MAR. 2, 1903.
NO MODEL. 15 SHEETS—SHEET 1.
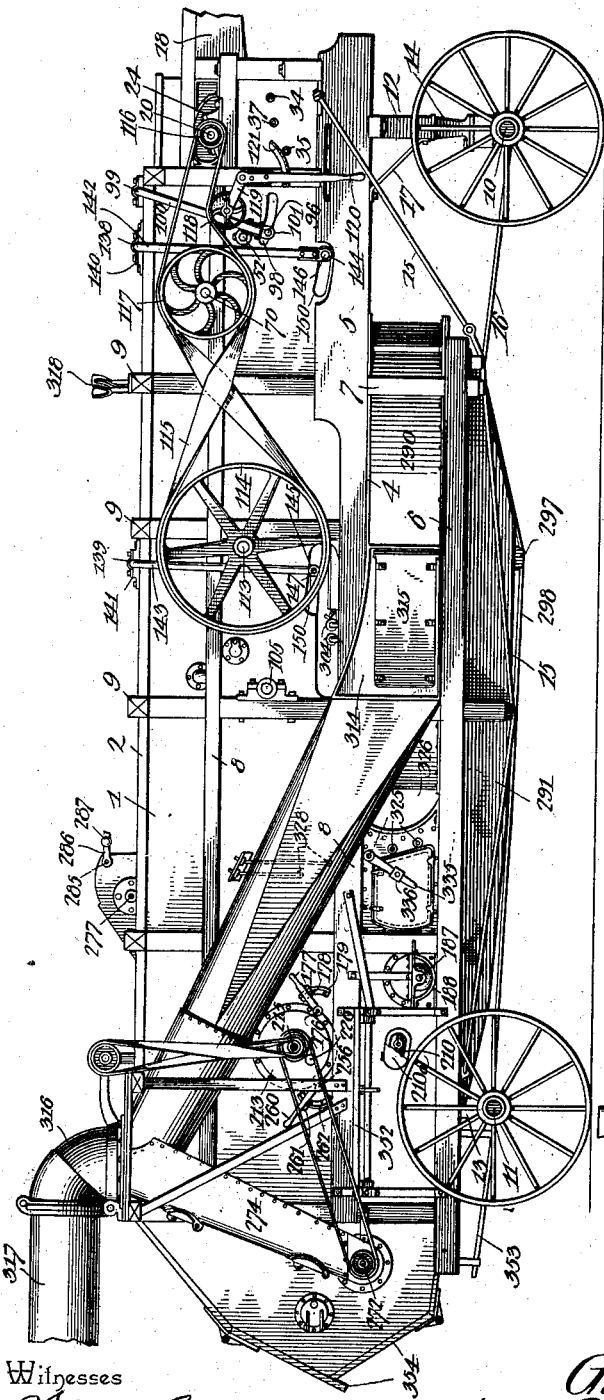
*Fig. 1.*
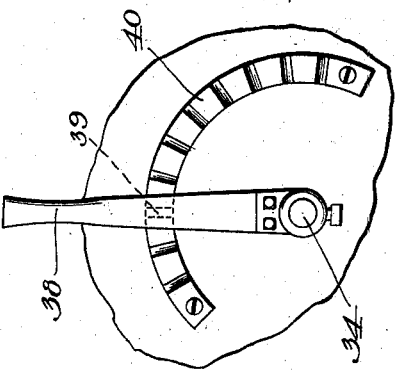
*Fig. 1ª.*
Witnesses G. W. Hill, Inventor.
by C. A. Snow & Co.
Attorneys No. 757,307. PATENTED APR. 12, 1904.
G. W. HILL.
GRAIN SEPARATOR.
APPLICATION FILED MAR. 2, 1903.
NO MODEL. 15 SHEETS—SHEET 2.
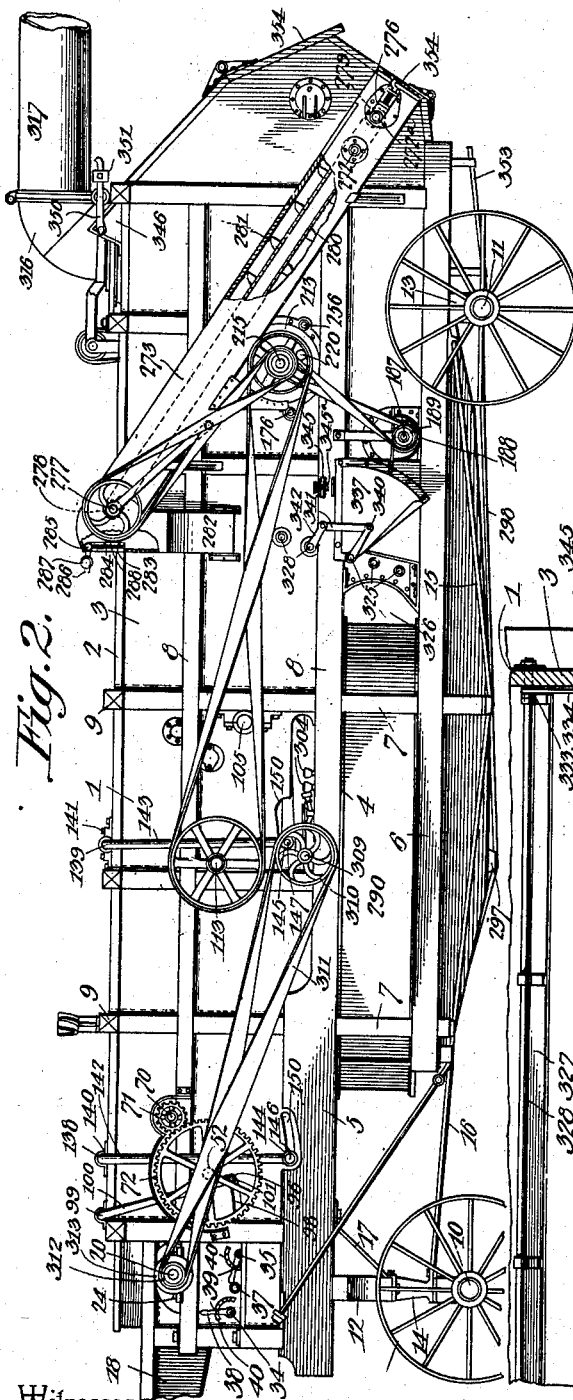
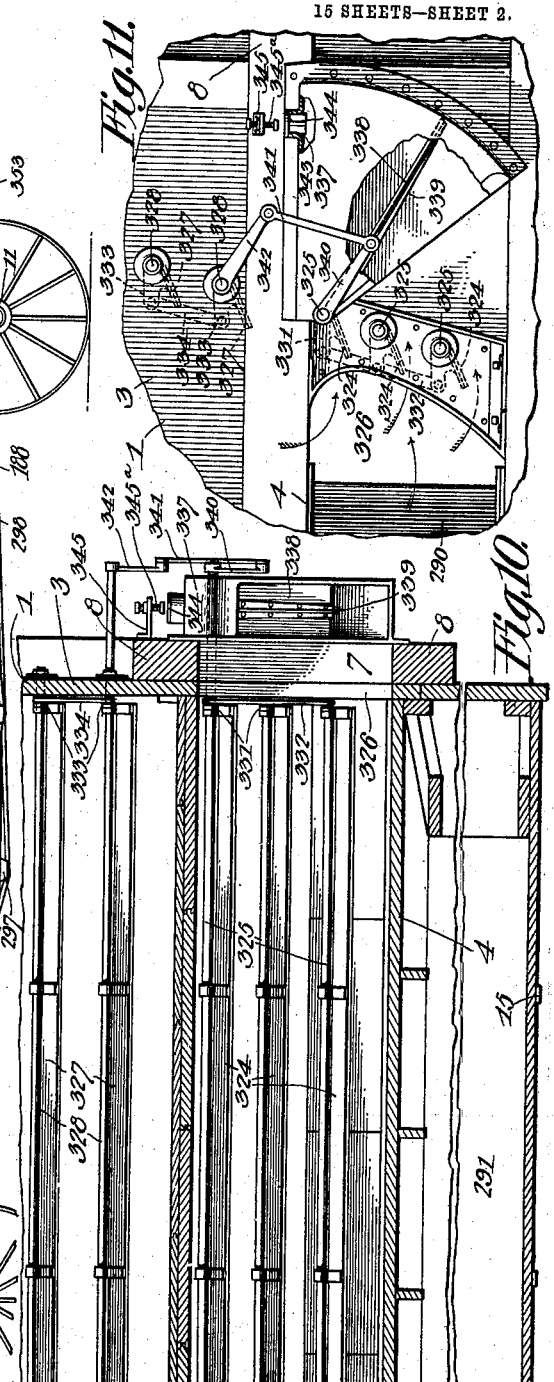
Witnesses
G. W. Hill, Inventor.
by C. A. Snow & Co.
Attorneys No. 757,307. PATENTED APR. 12, 1904.
G. W. HILL.
GRAIN SEPARATOR.
APPLICATION FILED MAR. 2, 1903.
NO MODEL. 15 SHEETS—SHEET 3.

Witnesses
G. W. Hill, Inventor.
by C. A. Snow & Co.
Attorneys

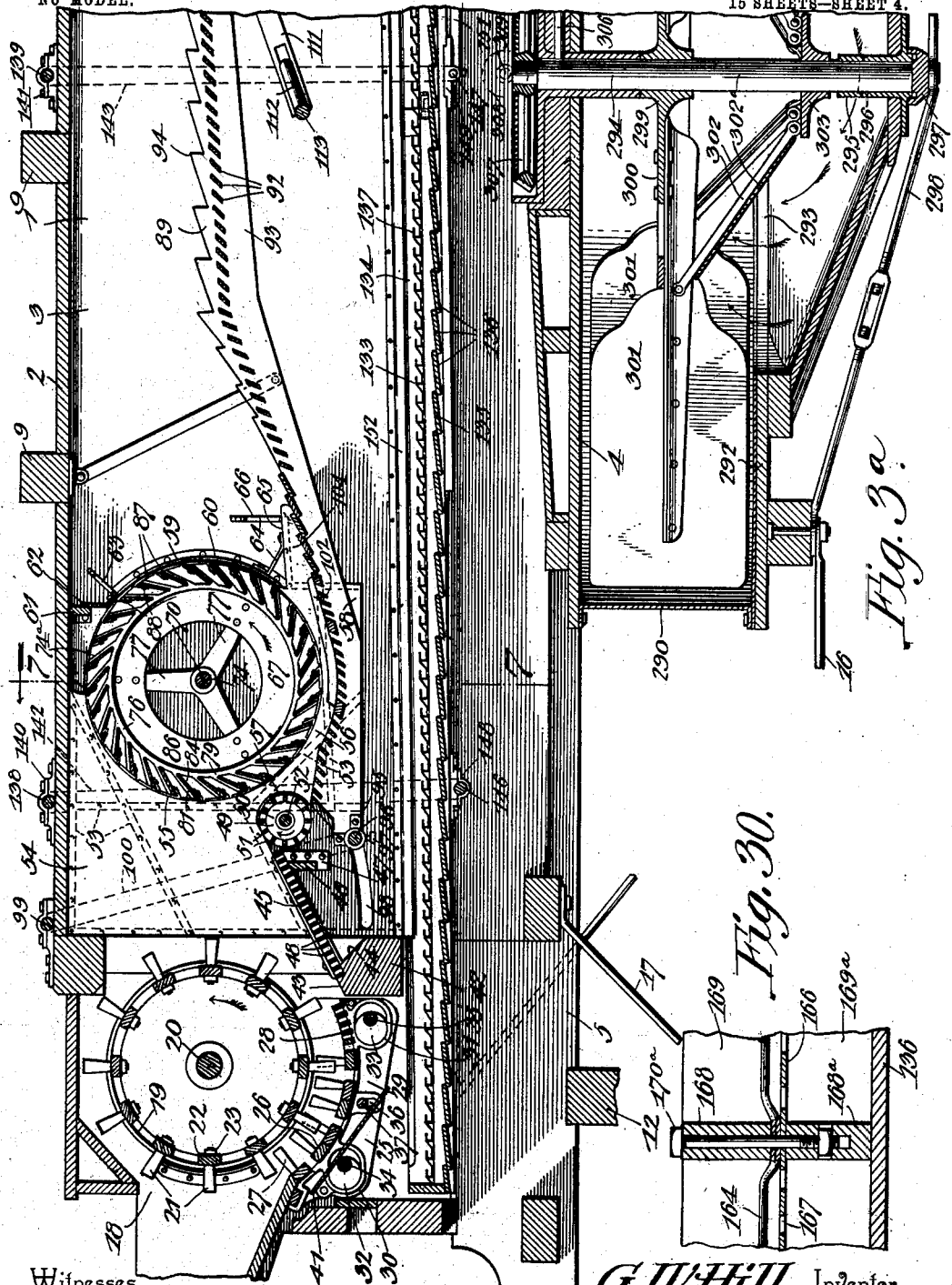

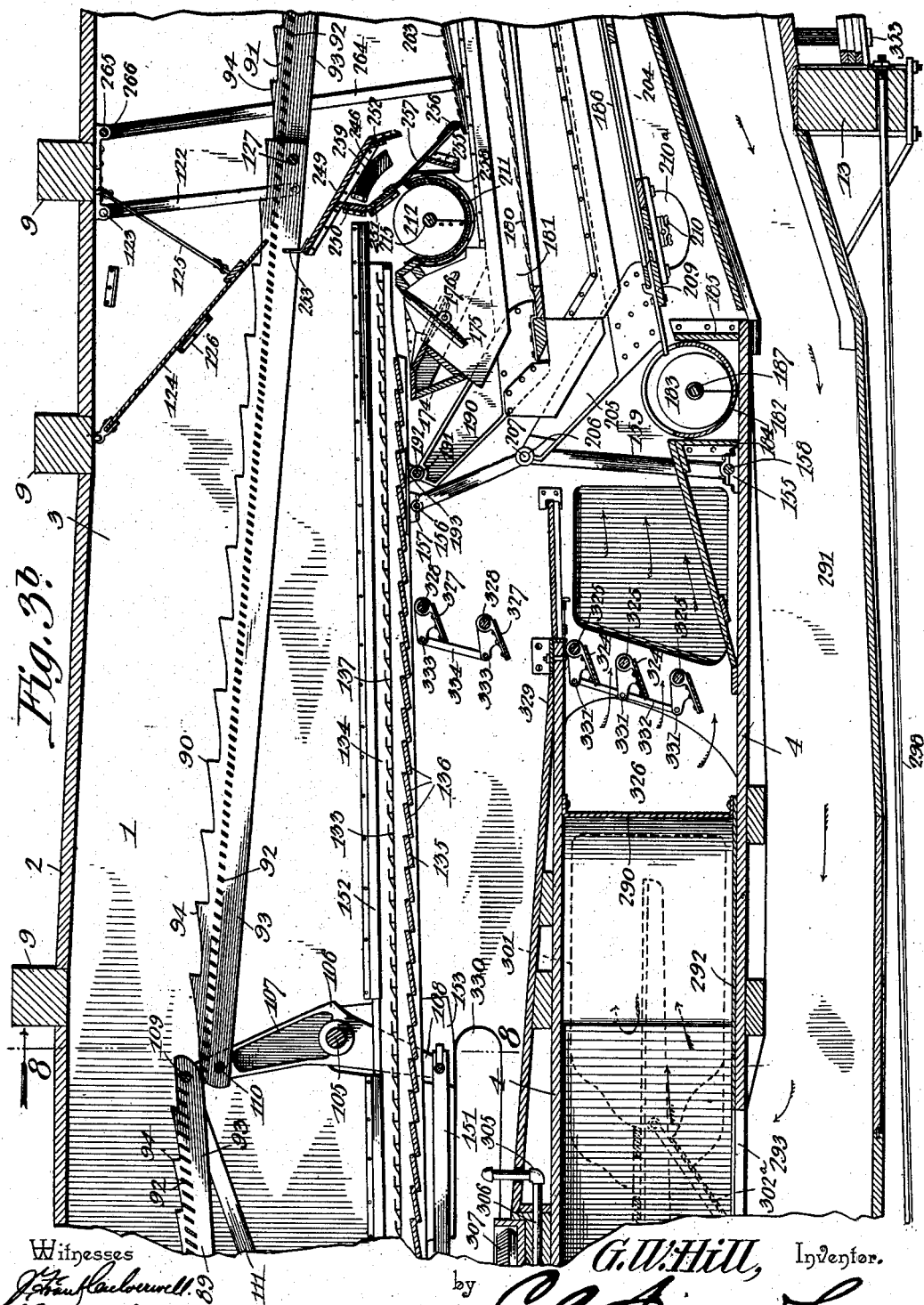

No. 757,307. PATENTED APR. 12, 1904.
G. W. HILL.
GRAIN SEPARATOR.
APPLICATION FILED MAR. 2, 1903.
NO MODEL. 15 SHEETS—SHEET 6.
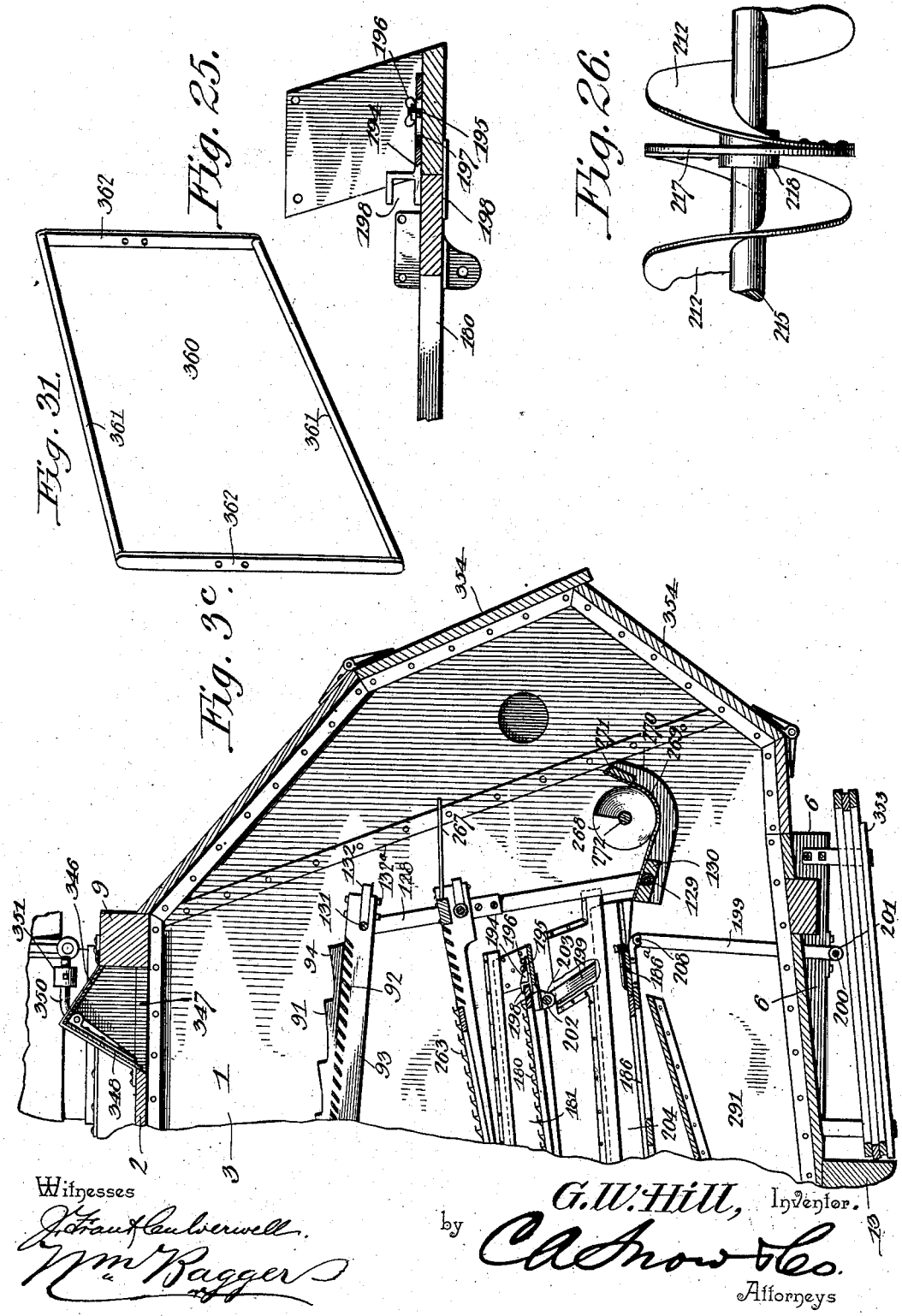
Witnesses
G. W. Hill, Inventor.
by C. A. Snow & Co.
Attorneys

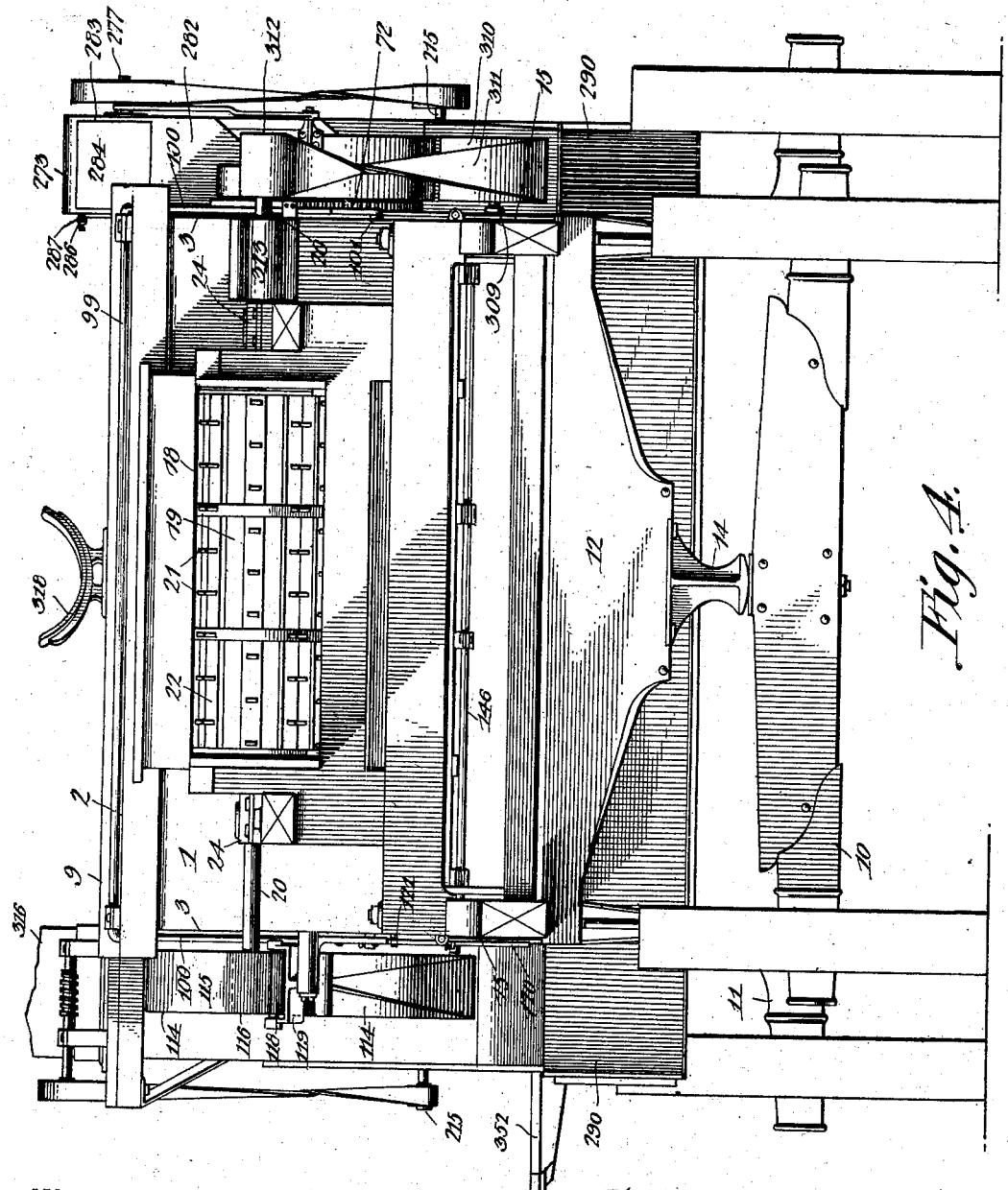

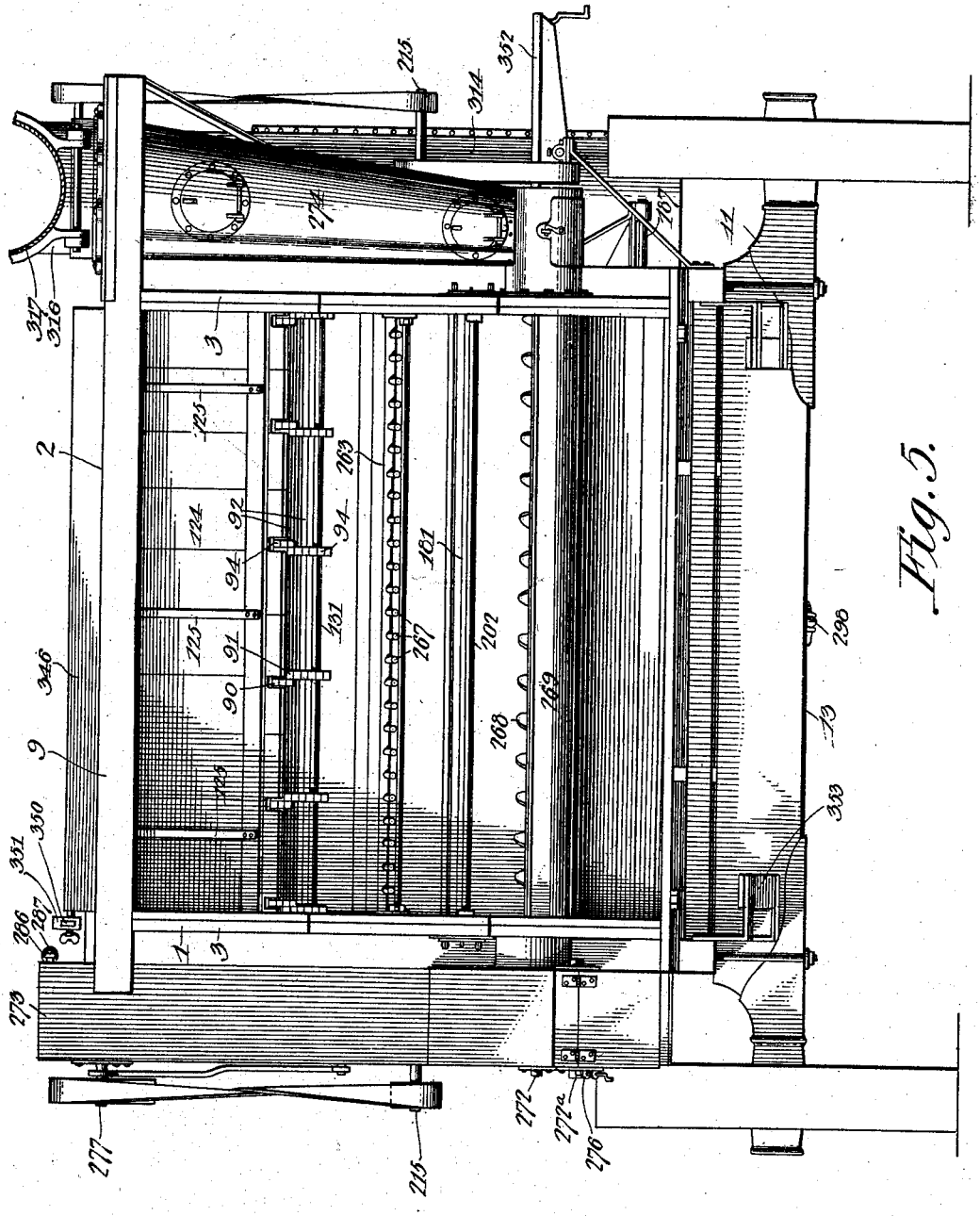

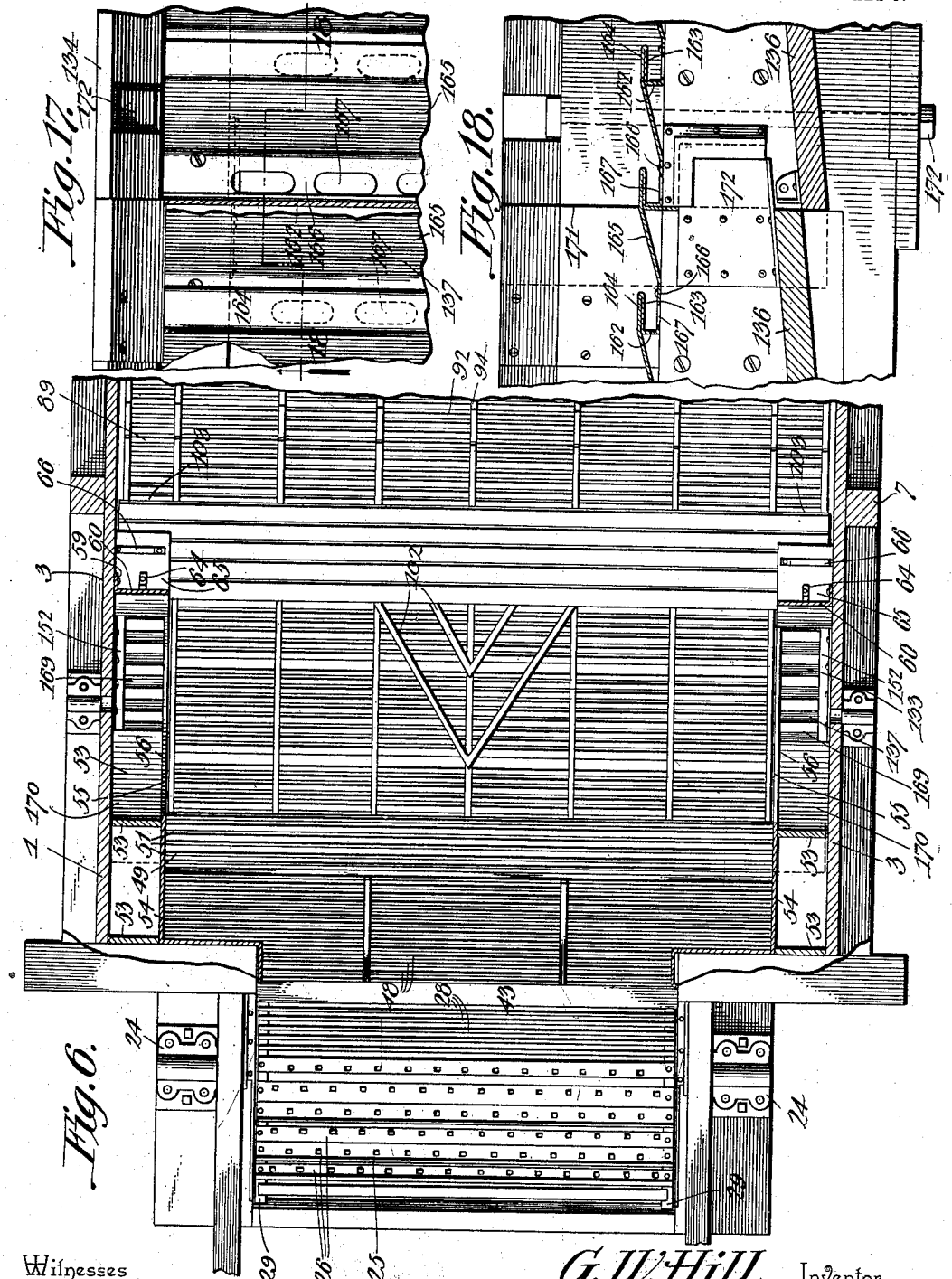

No. 757,307. PATENTED APR. 12, 1904.
G. W. HILL.
GRAIN SEPARATOR.
APPLICATION FILED MAR. 2, 1903.
NO MODEL. 15 SHEETS—SHEET 10.

Witnesses
G. W. Hill, Inventor.
by C. A. Snow & Co.
Attorneys

No. 757,307. PATENTED APR. 12, 1904.
G. W. HILL.
GRAIN SEPARATOR.
APPLICATION FILED MAR. 2, 1903.
NO MODEL. 15 SHEETS—SHEET 12.
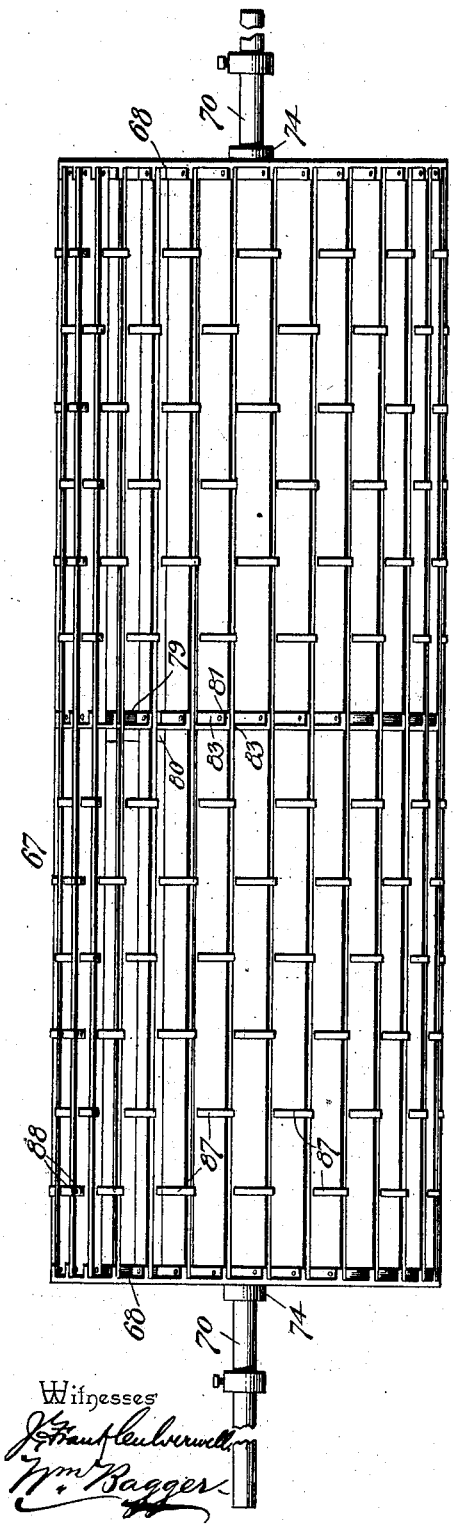
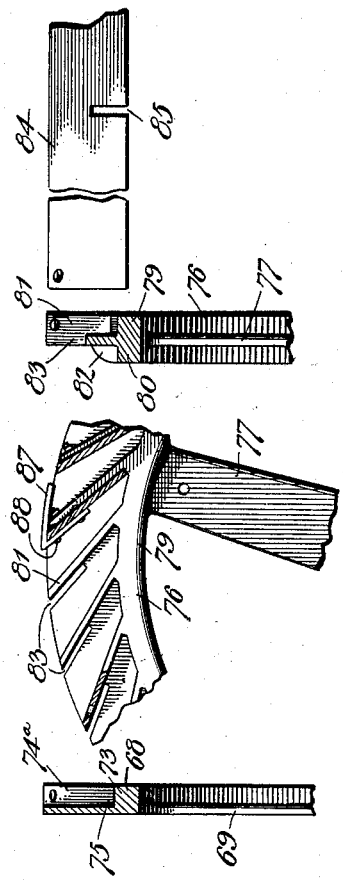
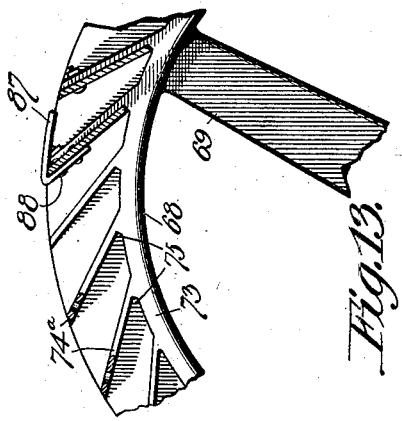
Witnesses
G. W. Hill, Inventor.
by C. A. Snow & Co.
Attorneys

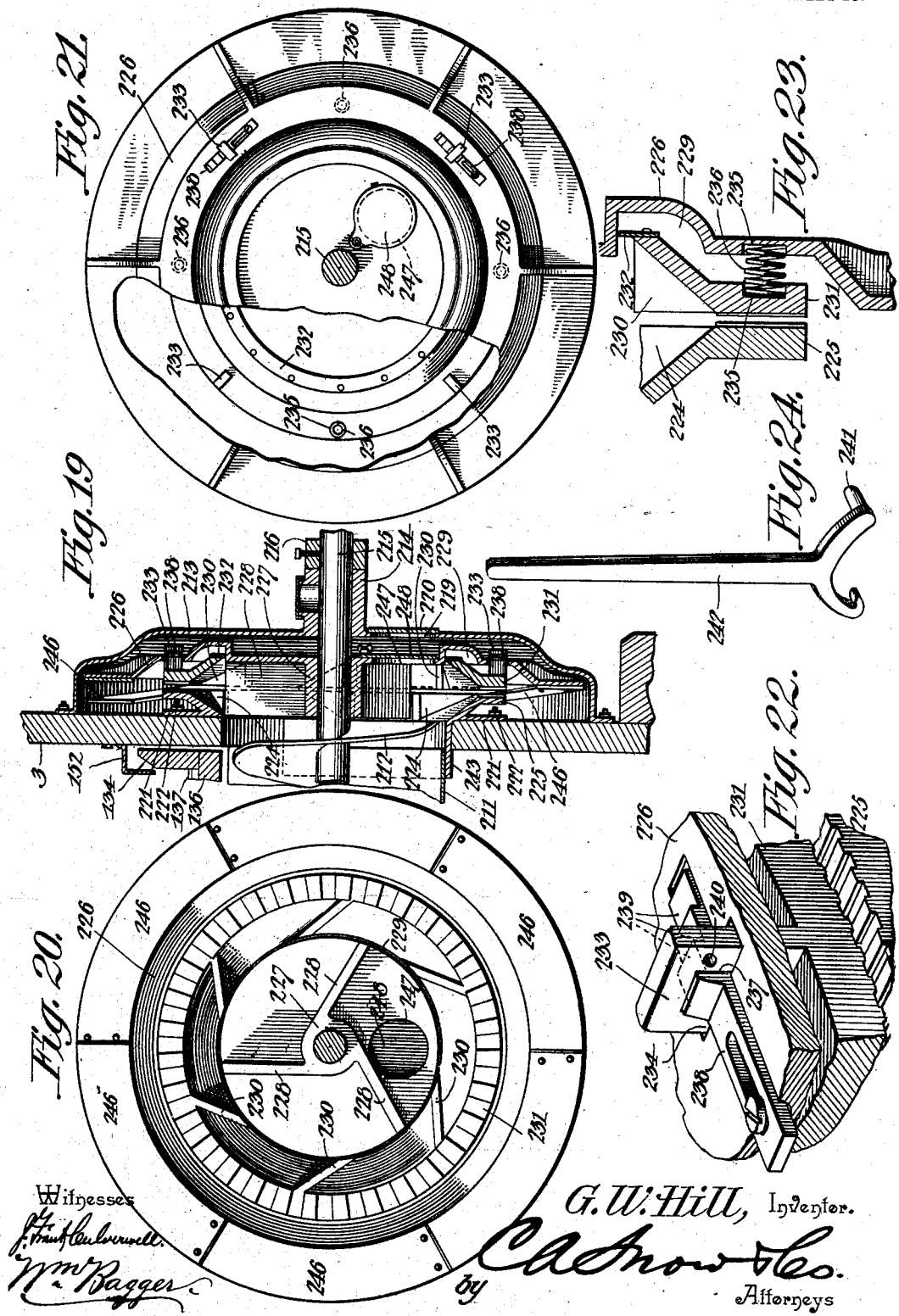

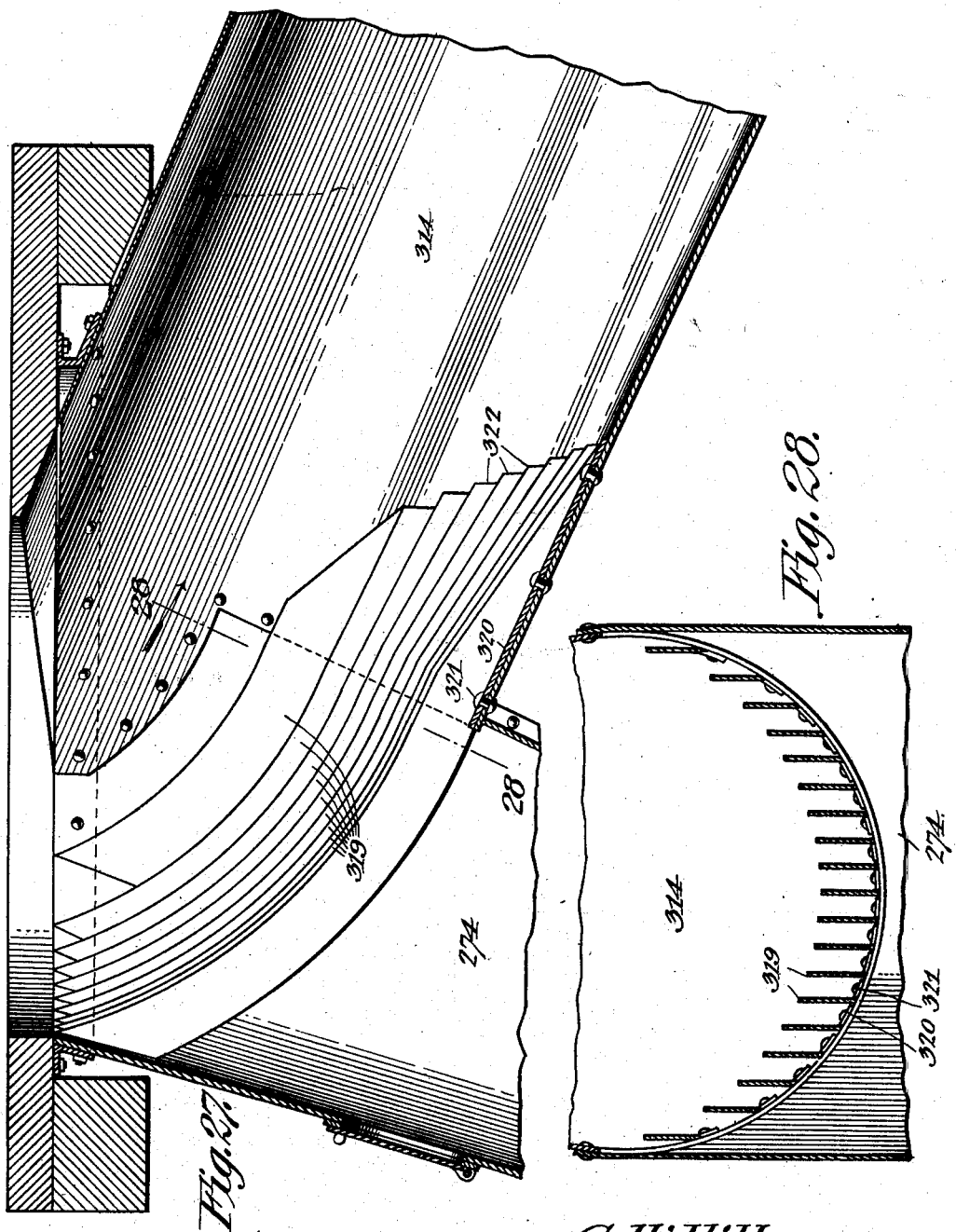

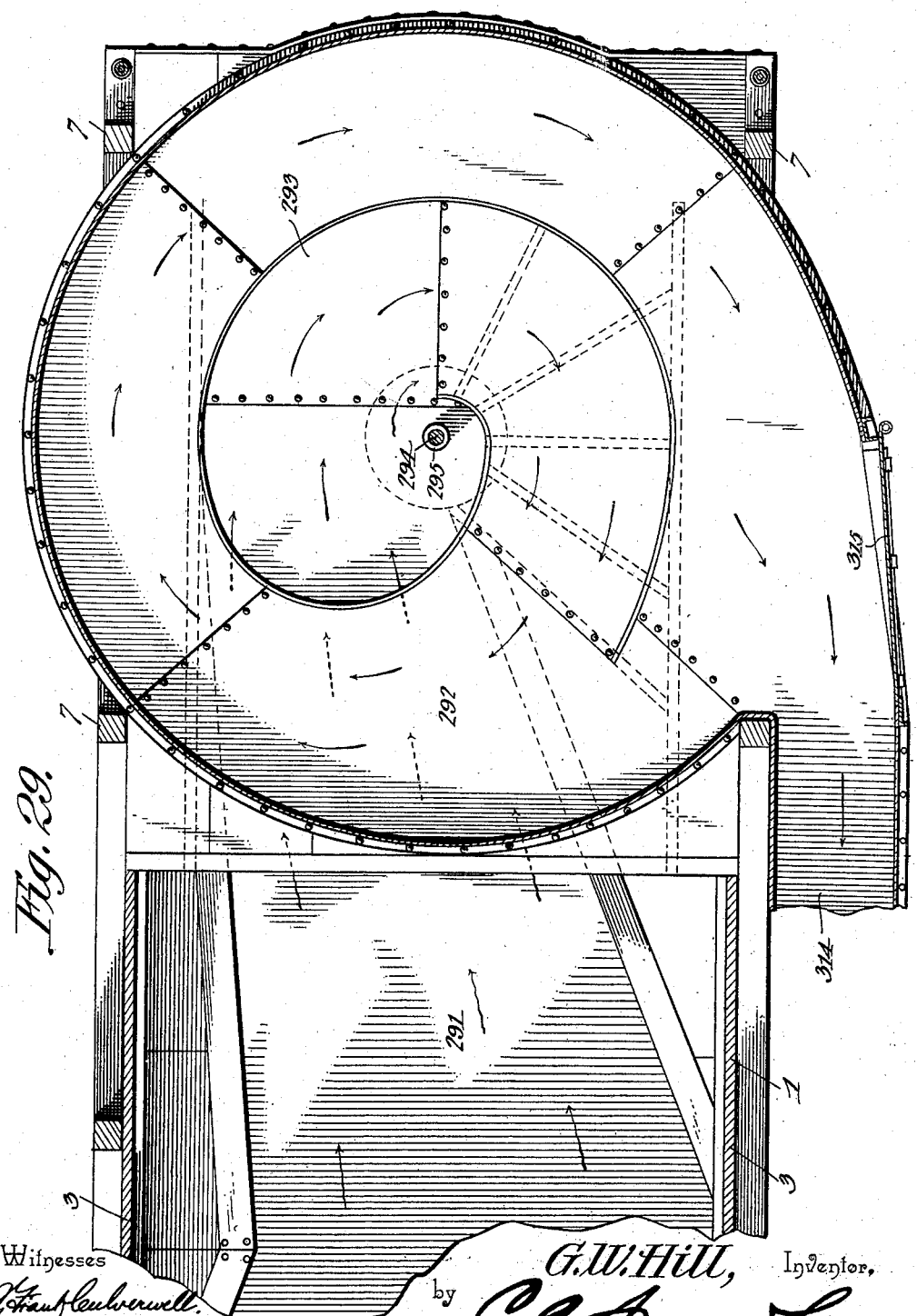

No. 757,307. Patented April 12, 1904.

UNITED STATES PATENT OFFICE.

GRAN W. HILL, OF ALEXANDRIA, MISSOURI.

GRAIN-SEPARATOR.

SPECIFICATION forming part of Letters Patent No. 757,307, dated April 12, 1904.

Application filed March 2, 1903. Serial No. 145,782. (No model.)

*To all whom it may concern:*

Be it known that I, GRAN W. HILL, a citizen of the United States, residing at Alexandria, in the county of Clark and State of Missouri, have invented a new and useful Grain-Separator, of which the following is a specification.

This invention relates to threshing-machines and grain-separators.

In threshing-machines and separators as ordinarily constructed one of the main objects usually sought to be attained is to effect the separation of the grain from the straw at the earliest possible stage or, in other words, as soon as possible after the straw and grain leave the threshing-cylinder and concave or while still being operated upon by these elements. This is for the very obvious reason that while the said straw and grain are still being subjected to the violent concussion of the teeth of the cylinder and concave, whereby the grain is being dislodged from the ears, and while the broken-up straw and ears are still subject to a violent agitation this separation may be most easily effected, the grain, which is the heavier, seeking a lower level, which permits it to be coarsely screened and separated from the straw and empty ears. A machine which succeeds in thus separating a large percentage of the grain from the straw at a very early stage may be said to have accomplished a very important part of the work. Machines now in use are estimated to separate from seventy-five to ninety per cent. of the grain at this early stage. Even those machines, however, which most satisfactorily perform this early part of the work and which embody the best principles known in the art still have an extremely-important function to perform in separating the remainder of the grain from the straw, so as to avoid waste as nearly as possible. The primary separation is effected with comparative ease, for the reason that at the time of this separation the straw and grain are in a state of violent agitation, which greatly facilitates the work. As the straw progresses through the machine, however, it carries with it more or less grain, some of it loose and some still embedded in ears or in broken parts of ears. As the separation progresses more or less of this grain is separated and saved; but it is conceded that even in the most perfect machines known at the present time there is a percentage of waste which, even when reduced to a minimum, has been an important source of loss to the producer. To minimize or even to totally avoid this loss may be stated to be the principal object of my invention.

Further objects of my invention are to simplify the general construction as nearly as may be done consistently with the attainment of the principal object, also to produce a machine which shall be comparatively light-running and in which all of the working parts shall be conveniently accessible, so that the progress of the work may be noted and that the operators may assure themselves of the satisfactory performance of the work.

With these and other objects in view my invention consists in the improved construction, arrangement, and combination of parts, which will be hereinafter fully described, and particularly pointed out in the claims.

Figure 7:
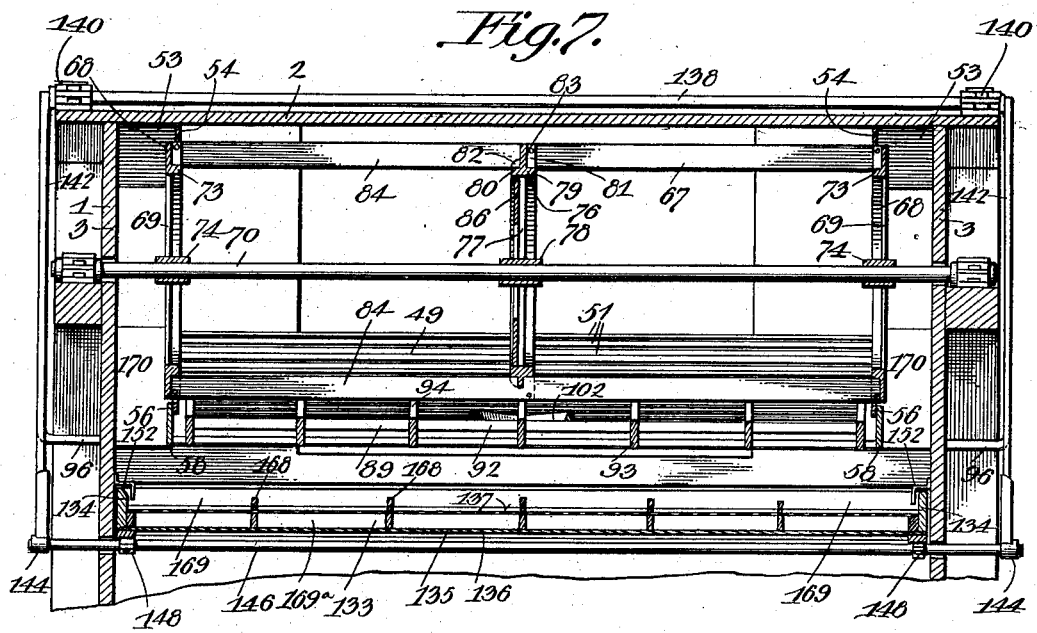
Figure 8:
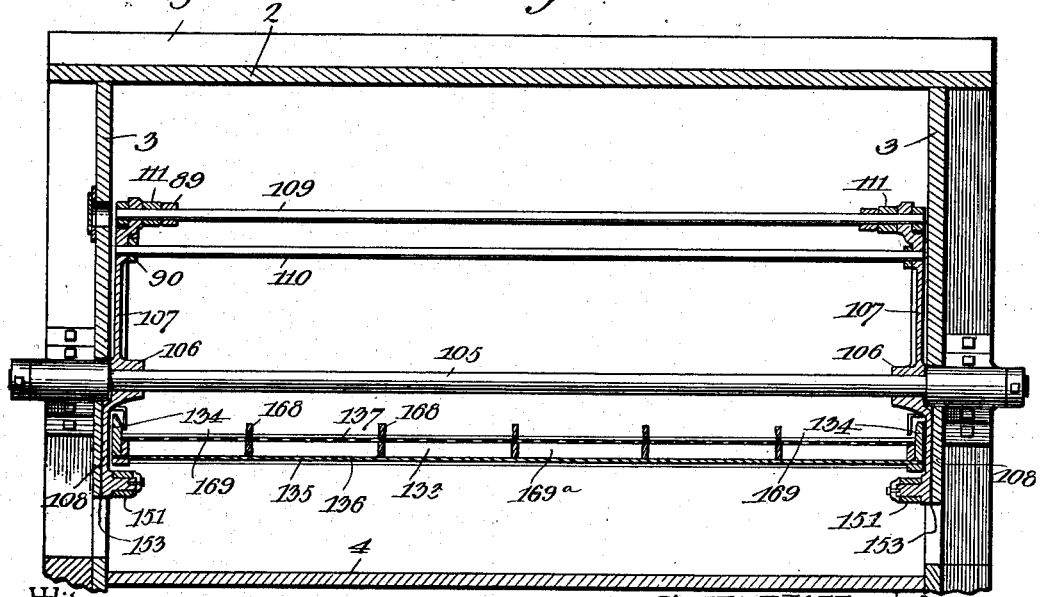
Figure 9:
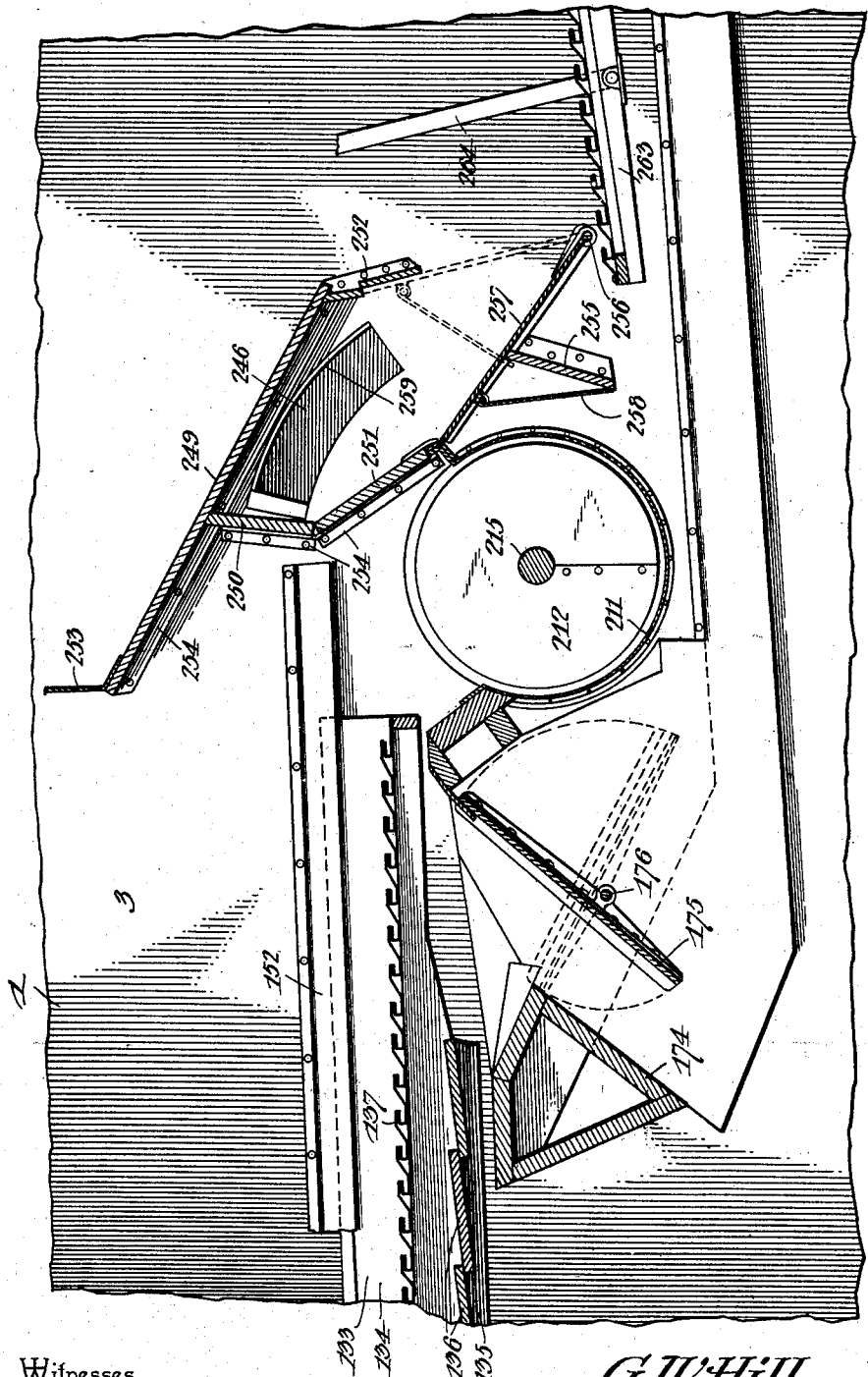

In the accompanying drawings, Figure 1 is a side view of a grain-separator constructed in accordance with the principles of my invention. Fig. 1$^a$ is a detail side view, on an enlarged scale, of a portion of the front end of the machine, showing means for adjusting and locking the concave. Fig. 2 is a side view of the same, taken from the opposite side of the machine. Fig. 3 is a longitudinal vertical sectional view constructed diagrammatically to indicate the location of the most important constituent parts of the machine. Fig. 3$^a$ is a longitudinal vertical sectional view of the front part of the machine, including the threshing-cylinder and concave, the separating-cylinder, and the front parts of the straw-rack and grain-pan, as well as a portion of the suction-fan and its casing. Fig. 3$^b$ is a longitudinal vertical sectional view of the central part of the machine, including the rear part of the suction-fan casing and the inlet-duct to the same. Fig. 3$^c$ is a longitudinal vertical sectional view of the rear or tail end of the machine. Fig. 4 is a front view of the machine with parts of the casing removed to show the interior. Fig. 5 is a rear view of the machine with the rear end of the casing removed to show the interior construction. Fig. 6 is a horizontal sectional detail view exposing the parts below and directly in front and in rear of the separating-cylinder, the latter having been removed. Fig. 7 is a vertical sectional view taken through the separating-cylinder and related parts, taken on the line 7 7 in Fig. 3ª, looking in the direction of the throat of the machine and omitting intermediate slats of the separating-cylinder. Fig. 8 is a sectional view taken on the line 8 8 in Fig. 3ᵇ. Fig. 9 is a sectional detail view, on an enlarged scale, showing the discharge end of the separating-screen, the screw that receives the discharge from said screen, and related parts. Fig. 10 is a sectional view taken transversely through a portion of the machine and showing in elevation the valves whereby the admission of air to the suction-fan is automatically regulated. Fig. 11 is a side view, partly in section, indicating the relative location and construction of said valves. Fig. 12 is a plan view showing the separating-cylinder removed from the machine. Figs. 13, 14, 15, and 16 are detail views to illustrate the construction of said separating-cylinder. Fig. 17 is a detail plan view, on an enlarged scale, showing a portion of the separating-screen. Fig. 18 is a sectional view taken on the line 18 18 in Fig. 17 and showing also the parts underlying the separating-screen—namely, the grain-bottom and related parts. Fig. 19 is a vertical transverse sectional view of one of the grinding-burs, the casing for the same, and related parts. Fig. 20 is an elevation showing the inner side of the revoluble member of the grinding-bur. Fig. 21 is a view showing the outer side of said revoluble member, parts having been broken away for the purpose of exposing the underlying construction. Figs. 22, 23, and 24 are detail views illustrating the means whereby the adjustment of the flexibly-supported part of the revoluble grinding member may be effected. Fig. 25 is a sectional detail view illustrating the means for effecting the adjustment of the separating-screens in the shoes or casings supporting the same. Fig. 26 is a detail elevation of the central portion of the double screw which receives the discharge from the separating-screen and delivers the same to the grinding-burs. Fig. 27 is a longitudinal vertical sectional detail view of the upper part of the discharge-spout of the separator. Fig. 28 is a transverse sectional view taken on the line 28 28 in Fig. 27. Fig. 29 is a horizontal sectional view of the casing of the suction-fan and adjacent parts, including the inlet to and the discharge from said fan-casing. Fig. 30 is a sectional detail to illustrate the detailed construction of the grain-bottom. Fig. 31 is a perspective detail view illustrating a modified form of a hanger-frame, a number of which are used in connection with my invention.

The casing of the machine, which is generally designated 1, may be of any suitable construction. In the drawings it has been shown as comprising the top or deck 2, the sides 3 3, and the bottom 4, which latter will be hereinafter referred to as constituting in part the top of the fan-casing. This framing or casing is supported upon the main sills 5 5 and 6 6, which are spaced by uprights 7, which are extended upward and connected by the longitudinal frame-beams 8 and cross-beams 9. The sills 5 and 6 are supported, respectively, upon the front and rear axles 10 and 11, bolsters 12 and 13 being interposed, as is usually the case. A casting 14 is interposed between the front axle and the bolster 12 in order to properly space the parts and dispose the front end of the casing at a proper elevation. Truss-rods 15 and braces 16 and 17 are also employed in order to suitably strengthen and brace the parts of the frame. It is obvious that the mechanical construction of the frame may be altered or modified if it shall be found desirable to do so. I have endeavored in the accompanying drawings to illustrate what I consider a compact, durable, and desirable construction which shall be capable of withstanding any strain to which the machine shall be subjected either in operation or in transit. I desire it to be understood that I do not limit myself with regard to the structural details other than as will hereinafter appear if such structural details shall be deemed essential to the successful operation of the machine as an entirety.

At the front end of the casing is the throat 18, through which the grain is fed to the threshing-cylinder and concave. The threshing-cylinder 19, which is mounted upon shaft 20, is of ordinary construction, said cylinder being provided with teeth 21, secured on longitudinal bars 22 by means of nuts 23. The shaft 20 has its bearings in boxes 24 upon longitudinal frame-beams 8.

The concave 25 is composed of cross-bars 26, provided in the usual manner with teeth 27, the rear end of said concave being provided with a grating 28, the bars of which are spaced somewhat closer together than the bars 26, but which nevertheless admit of the free passage of grain to the grain-pan, which is disposed below and which will be hereinafter fully described. Said concave is provided at its ends with downward-extending flanges 29, having oblong or elliptical recesses 30 and 31 near their front and rear ends in which eccentrics or cams 32 and 33, mounted upon shafts 34 and 35, engage. The said flanges 29 are also provided with vertical slots 36, engaging a shaft 37, the ends of which extend through the sides of the casing, where said shaft is properly secured. This shaft, while permitting either of the rocking or of the vertical adjustment of the concave, serves to positively prevent displacement of the latter either in a forward or a rearward direction. The shafts 34 and 35, carrying the eccentrics, are extended at one side of the casing and are provided with operating-levers 38, having lock-dogs 39, engaging segment-racks 40, and whereby they may be retained in any position to which they may be adjusted. It will be observed that by this arrangement the shafts carrying the eccentrics may be turned independently of each other, so as to independendly raise or lower the front and rear ends of the concave, which is supported by the eccentrics mounted upon said shafts. By this mechanism the concave is made capable of adjustment with relation to the face of the cylinder in such a manner as to place the said concave in a position either concentric or eccentric with relation to said cylinder, either the front or the rear end of said concave being capable of being placed closest to the face of the cylinder at the will of the operator. This is an important feature of my invention, inasmuch as various grains require a different adjustment, and it is also desirable to be able to regulate the adjustment of the concave with relation to the cylinder according to the state of the grain that is to be operated upon, whether it be dry or more or less damp.

41 designates an inclined plate or deflector which is disposed between the flanges 29 of the concave under the front part of the latter, said deflector extending from the front in a downward and rearward direction for the purpose of directing the grain that passes between the bars of the concave into the grain-pan underneath without danger of its escaping into the space between the front end of said grain-pan and the front part of the casing of the machine, especially when the grain-pan is at the rearward end of its stroke or longitudinal movement.

It is obvious that the concave when properly adjusted is firmly supported by the means herein described in such a manner as to render it incapable of displacement by the action of the cylinder during the operation of the machine.

42 is a cross-beam within the casing, the upper side of which is forwardly and rearwardly beveled or inclined, as shown at 43 and 44.

45 is a grating supported at its front end upon the cross-beam 42 and at its rear end upon a cross-bar 46, the said grating being placed in such a position as to form a continuation of the forward incline 43 of the upper side of the cross-beam 42. Additional supporting-flanges, as 47, may be disposed at either end of the cross-bar 46. The cross-bars 48 of the grating are inclined downwardly and rearwardly, so as to be approximately parallel to the beveled face 44 of the cross-bar 42. The grating 45 terminates directly in front of a rotary grate 49, which will be presently more fully described. It will be observed that by this construction and arrangement of the grate 45 the straw and grain coming from the cylinder and concave will be thrown violently against the bars of said grate, engaging the edges of the bars of said grate, which operate effectively not only to separate the loose grain from the straw, but also to subject the ears still containing grain to a degree of friction which is effective in dislodging the grain and permitting it to escape.

The rotary grate (designated 49) is composed of heads 50, spaced by the grate-bars 51, which are secured to said heads in any suitable manner, said heads being mounted upon a shaft 52, having bearings in the casing of the frame of the machine. This rotary grate receives the straw and grain passing rearwardly over the grating 45 from the cylinder and concave and serves to convey the same in a rearward and downward direction. It also at the same time permits the passage of grain, loose and broken heads, and the like between its bars and to the grain-pan, which, as already stated, is disposed underneath in the lower part of the casing. This rotary grate also coöperates with another important member of my improved separator and which I designate the "separating-cylinder."

Before proceeding to describe in detail the construction of the separating-cylinder I desire to state that the function of the said cylinder is to separate from the grain and straw the largest possible proportion of loose grain, broken ears, and the like and to discharge the same at the open heads or ends of said cylinder, the discharge from said separating-cylinder being into special side compartments at the sides of the grain-pan, where it is subjected to further action, as will be hereinafter described. In order, however, to thus discharge the contents of the separating-cylinder, it becomes necessary to construct within the casing of the machine an auxiliary casing within which the said separating-cylinder shall be partially confined, the sides of said auxiliary casing being disposed at a suitable distance from the sides of the casing proper and provided with openings through which the ends of the separating-cylinder may slightly protrude, so that the contents from said separating-cylinder will be delivered between the sides of said auxiliary casing and the sides of the casing proper, the grain-pan being of a width to extend entirely between the sides of the outer casing of the machine. The said auxiliary casing is preferably constructed of sheet metal, such as galvanized sheet-steel, and the side pieces of said casing are secured by means of nails or screws to cleats or frame-pieces, which in turn are properly secured to the walls of the separator-casing. These cleats or frame-pieces, which are designated 53, are of a width to suitably space the sides 54 of the auxiliary casing from the walls of the separator, said cleats or frame-pieces being suitably disposed substantially in the manner which has been indicated in dotted lines in Figs. 3 and 3ª of the drawings, it being understood that corresponding cleats are to be secured to the opposite wall, which is not seen in said figures. The side pieces 54 are recessed, as shown at 55, to accommodate the upper forward portion of the heads of the separating-cylinder. The lower edges of said side pieces terminate about on a level with the inclined grate 45 and with the upper portion of the rotary grate 49. Additional side pieces 56, secured to additional cleats or frame-pieces 53, are extended under the heads of the separating-cylinder, the upper forward edges of said side pieces 56 being extended under or overlapped by the lower edges of the side pieces 54. The side pieces 56 are recessed at 57 to accommodate the rotary grate, the cleats or frame-pieces 53 being so disposed as not to interfere with the operation of the latter. The side pieces 56 are reinforced by a board 58, secured to the cleats 53. Flange-bars 59, secured to the sides of the outer casing, are provided with flanges 60, extending laterally in an inward direction and engaging the rear portion of the heads of the separating-cylinder, said flanges being extended from the upper rear portion of the sides 56 and in an upward direction and terminating some distance in rear of the upper rear portions of the sides 54. The isolation of the body of the separating-cylinder from the interior of the machine-casing is completed by a cross-bar 61, secured to the under side of the deck of the casing and having a flexible strip 62, of leather, rubber, or other suitable material, that extends almost to the periphery of the separating-cylinder or as close to the latter as it may without interfering with the operation thereof. Braces 63 and 64 connect the flanges 60, respectively, with the walls of the casing and with horizontally-disposed shelves or brackets 65, which latter are connected with the walls of the casing by additional braces 66, said shelves or brackets serving to coöperate with the straw-rack of the machine for a purpose to be hereinafter set forth.

67 designates the separating-cylinder. Said cylinder is provided with heads 68, having radiating arms 69, whereby they are mounted upon a shaft 70, which has its bearings in the walls of the casing. One of the projecting ends of the shaft 70 carries a pinion 71, meshing with a gear-wheel 72 upon the shaft 52 of the rotary grate, which latter thus receives motion at a decreased rate of speed from the separating-cylinder, which, as will be hereinafter seen, derives its motion from the threshing-cylinder. The head or ends of the separating-cylinder have been shown in detail in Figs. 13 and 14 of the drawings, by reference to which it will be seen that they are composed of comparatively narrow rings provided with the radial arms 69 and provided at their inner edges with inwardly-extending lateral flanges 73. The radial arms or spokes 69 are centrally connected by the hubs 74. (Best seen in Fig. 3ª of the drawings.) It will also be understood that the heads are made right and left, although a portion of one of the heads only appears in Figs. 13 and 14. The rings 68, which constitute the heads, are provided upon their inner sides with flanges 74ª, which may be described as being tangential to a smaller circle and concentric with the circumferential flanges 73 and coacting with the latter to form recesses or sockets 75. In addition to the heads or ends I employ a centrally-disposed supporting-ring 76, having radial arms or spokes 77, connecting with a hub 78 and provided with laterally-extending circumferential flanges 79 and 80 and with flanges 81 and 82, which are tangential to a smaller circle described concentrically with the supporting-ring and of equal diameter to the imaginary circle to which the flanges 74ª have been described as being tangential and which coöperate with the said circumferential flanges to form recesses or sockets similar to those which are indicated at 75 in Fig. 13. The ring 76 is provided with slots or notches 83 adjacent to the tangential flanges 81 and lugs 82 of said ring. The blades 84 of the separating-cylinder are provided with centrally-disposed slots 85, adapted to engage the sides of the supporting-ring 76, in the notches 83 of which the said blades are seated, the inner edges of said blades engaging the recesses or sockets formed between the annular flanges 79 and 80 and the flanges 81 and lugs 82, respectively. The ends of the blades similarly engage the sockets 75, formed between the flanges 74ª and the annular flanges 73 of the heads, said blades being secured to the flanges 74ª of the heads, as well as to the flanges 81 of the central supporting-ring, by means of bolts or rivets, thus securing an unusually firm and solid connection between the parts.

Suitably attached to the radial arms or spokes of the central supporting-ring is a dividing-ring 86 of suitable width, as will be seen in Fig. 3ª of the drawings. This ring serves to divide the separating-cylinder practically into two compartments, the contents of which will be delivered through the two eyes or ends of the cylinder. This is for the purpose of preventing either end from being overcrowded at any time if a tendency should arise for the contents of said cylinder to travel in one direction only.

I have hereinbefore referred to the flanges that support the blades 84 as being "tangential" and I have also stated that they are tangential, not to the separating-cylinder, but to an imaginary circle of smaller diameter. Where the said blades 84 are hereinafter referred to as being "tangential," it will be borne in mind that they are not tangential to the separating-cylinder, of which they form parts or members, but to an imaginary circle of smaller diameter, the word "tangential" being employed as best expressive of the disposition of said blades.

Suitably secured to the tangential blades 84 of the separating-cylinder are a plurality of retarding-braces 87, consisting of short metal bars bent to an approximate V shape and secured to what may be designated as the "upper" sides of the tangential blades by means of small bolts or rivets 88. From the outer edges of said blades the braces 87 extend in the direction of the adjacent blades, as will be clearly seen in the drawings, without, however, being secured to said adjacent blades. These braces will thus be possessed of some degree of resiliency, and being attached to alternate blades staggering with relation to each other they will perform an important function in preventing long straw from entering between the blades of the separating-cylinder. This is an important consideration, for the reason that only loose grain, ears containing grain, broken ears, and short straw, with which grain has become intertangled, should be permitted to enter the said separating-cylinder.

In operation the separating-cylinder and the rotary grate revolve in the direction of the arrows shown in Fig. 3ª, the former at a high and the latter at a low rate of speed. The discharge from the threshing-cylinder and concave is thrown violently in an upward and rearward direction. Much of the loose grain will have been separated through the bars of the concave and much more will escape between the bars of the inclined grate 45, which act to some extent to intercept the discharge from the concave. The main discharge, however, is in an upward and rearward direction directly against the face of the separating-cylinder. It will be seen that the extreme inclination of the blades 84 to the radii of the cylinder, in connection with the direction of said inclination with respect to the direction of its rotation, causes the undershot separating-cylinder to present upon its down-going side a series of downwardly and outwardly inclined slats presented most nearly edgewise toward the threshing-cylinder, and consequently also the utmost width of the openings between said slats. This downward and outward inclination of said slats on this side of the cylinder and that also of the interspaces have most favorable correspondence to the lines in which the grains, &c., are projected from the threshing-cylinder, and consequently the relation most favorable to the entrance of the grain and finer matter into the interior of the separating-cylinder. On the other hand, the extreme inclination to the radii of the upgoing portion of the slats on the rear or far side of the separating-cylinder offer the maximum obstruction to the escape between them of the grains, an obstruction which is aided by gravity, said obstruction increasing in the upward movement of the slats and their approach to the perpendicular. The grains and finer matters are thus checked and spilled back into the interior by the ascending slats, and as they accumulate, being the finer, heavier, more mobile elements, they gradually overflow or are spilled by the rotation of the cylinder through the eye or opening in each end thereof. The inclination of the slats 84 being so great, almost tangential to a circle touched by their inner edges and being not backward but forward with respect to the direction of rotation of the cylinder, it will be seen that they will exert the least possible centrifugal action, not merely upon the grains and small matters, but also upon the air. Long straw is prevented from entering the separating-cylinder by the spring-braces 87, which, being attached at one end only, may be said to act as vibrators, whereby the long straw is thrown back and disentangled from loose grain. In the meantime the straw, which has now been deprived of by far the largest percentage of loose grain, drops upon the rotary grate and passes between the latter and the separating-cylinder to the straw-rack, the front end of which is disposed directly under said separating-cylinder, which latter coöperates with the reciprocating movement of the straw-rack to discharge or convey the straw onto the latter. The mass of straw passing under the separating-cylinder between its periphery and the concave surface of the front part of the straw-rack forms a bed or obstruction to the escape of finer matters at this point.

The separating portion of the machine is much wider than the threshing portion. (See especially Fig. 6.) The separating-cylinder is much longer than the threshing-drum. The straw-shaker is provided with spreading means, (designated 102,) which will be hereinafter more fully described. Consequently the threshed grain violently projected in a relatively dense condition from under the threshing-cylinder toward the separator is spread out, diffused, and loosened by the spreader 102 and by the combined action of the separating-cylinder and the shaker formed by the reciprocating straw-rack.

The operation of the separating-cylinder is assisted and rendered efficient by the natural tendency of the grain, which is comparatively heavy, to separate from the straw, which is comparatively light. Thus when the mixed mass discharged from the threshing-cylinder and concave is thrown violently in an upward and rearward direction the tendency will be for the grain and such portions of ears and the like as are rendered heavy by the adhesion of grain to travel more rapidly as well as more forcibly, and it follows that such heavy particles will readily be engaged by and forced into the separating-cylinder, while the lighter portion of the mass becomes readily separated and drawn beneath the cylinder. Long straw to which unthreshed ears still adhere is hardly ever encountered, and if found would denote an unnatural condition of the grain.

The straw-rack of the machine is composed of three separate parts or sections, (designated 89, 90, and 91.) The several sections resemble each other in this that they comprise in their construction slatted or grated boxes 92, supported upon longitudinal flanges or frame-pieces 93, provided on their upper surfaces with toothed or serrated racks 94, the teeth of which are faced in a rearward direction, so that the reciprocating movement of the straw-rack will tend to feed the straw longitudinally through the machine in the usual well-known manner, the slats constituting the bottoms of the racks being inclined forwardly and downwardly, so as to permit separation of the grain from the straw to take place during the entire course of passage of the straw through the casing of the machine. The straw-rack has, however, other peculiarities of construction, which will now be more fully described.

The front section 89 of the straw-rack extends forwardly under the separating-cylinder, and its upper surface is curved to correspond with the periphery of the said cylinder. The extreme front end of the front section is provided at its corners with castings 95, affording bearings for a transverse shaft 96, which is held securely in said bearings by means of set-screws 97. The projecting ends of the shaft 96 are extended through slots 98 in the walls of the casing, said slots being curved forwardly and downwardly, so as to guide the front end of the rack which is supported in said slots in a downward direction when it moves forwardly, so as to give it the proper inward pitch to carry the straw rearward, and also to avoid interference with the rotary grate or with the cross-bar 46, which supports the rear end of the inclined grate 45. A cross-shaft 99, supported in suitable bearings upon the top of the casing, is provided at its ends with downturned flattened arms 100, the lower ends of which have bearings 101 for the ends of the shaft 96, which project through the slots 98, thus supporting the front end of the straw-carrier in such a manner as to permit it to reciprocate longitudinally within the casing.

The front end of the front section 89 of the straw-carrier, comprising that portion which extends below and in front of the separating-cylinder, is not provided with feed-racks 94, but simply with a slatted or grated bottom to permit separation of grain from the straw which moves over it partly by the action of the separating-cylinder. The said slatted bottom is also provided with centrally-disposed V-shaped frogs 102, facing in a forward direction and tending to work the straw toward the side of the straw-rack, the purpose being to spread and separate the straw as nearly as possible over the entire width of the surface of the straw-rack. The latter, as will be readily understood, occupies the entire width of the casing, proper provision being made for preventing the straw from working in between the sides of the straw-rack and the walls of the casing, and thereby creating a degree of friction which it might require considerable power to overcome, and also to prevent straw and chaff from passing into the grain-bottom underneath, whereby it would impose an unnecessary burden upon the separating devices, which are to be hereinafter described. Such provision may be readily made by any mechanic familiar with the construction of this class of machines. It will be understood, however, that the width of the front end of the front section of the straw-rack must be reduced in order to enable it to fit between the sides of the auxiliary casing of the separating-cylinder. This reduction in width must obviously be sufficiently extensive to permit the straw-rack to reciprocate longitudinally, and it will be seen that when the said straw-rack is at the extreme limit of its rearward movement the shouldered or reduced front corners 103 of said straw-rack will be exposed in rear of the separating-cylinder, thus leaving openings through which straw might escape to the grain-pan below. It is for the purpose of covering these openings that the shelves or brackets 65 have been provided, said shelves or brackets being provided at their inner edges with downwardly-extending flanges 104, which while not interfering in the least with the longitudinal movement of the straw-rack will serve to effectually close the said spaces of openings.

A shaft 105, extending transversely through the casing of the machine, supports a pair of castings 106, one at each end. These castings, which are in the nature of bell-crank levers, are placed adjacent to the inner sides of the walls of the casing, as will be seen in Fig. 8, and each of said castings comprises an upwardly-extending arm 107 and a downwardly-extending arm 108. The upper ends of the upwardly-extending arms 107 of these castings have pivotal connection with the rear end of the front section of the straw-rack by means of a transverse shaft 109. Below the shaft 109 extends another transverse shaft 110, which pivotally engages the arms 107 of the castings or bell-cranks 106 and which supports the front end of the second section 90 of the straw-rack. The shaft 109 is connected, by means of pitmen 111, with cranks 112 upon a shaft 113, which extends transversely through the casing and which carries at one end a band-wheel 114, to which motion is transmitted by a belt or band 115 from the shaft 20 of the threshing-cylinder, which is provided with a pulley 116. The belt or band 115 also passes over a pulley 117 upon the shaft 70 of the separating-cylinder, said belt being crossed between the pulleys 114 and 117, as will be best seen in Fig. 2 of the drawings. A belt-tightening pulley 118 is carried upon a lever-arm 119, fulcrumed to the side of the machine and having an operating-handle 120, whereby it may be adjusted to bear with any desired degree of pressure against the belt 115 for the purpose of keeping the latter taut. The segment-rack 121 is provided for the purpost of engaging the handle 120, and thus keeping the belt-tightening device at any desired adjustment. It will thus be seen that motion is communicated directly from the shaft of the threshing-cylinder to the separating-cylinder and from the latter to the shaft 105, carrying the bell-cranks or castings 106, which latter serve to impart motion to the straw-rack as well as to the grain-pan, as will be hereinafter more fully described.

It will be seen from the foregoing that the front section 89 of the straw-rack is supported by the hangers 100 and by the arms 107, which latter form integral parts of the castings 106. Said arms 107 likewise serve to support the front end of the second section 90 of the straw-rack, the rear end of which is supported by vibratory arms or hangers 122, suspended from bearings 123 upon the under side of the deck of the casing. This second section of the straw-rack has no distinct peculiarities of construction, it consisting simply of the slatted bottom supported upon longitudinal flanges or frame-pieces and having the longitudinally-toothed feed-racks. Being connected with the operating-arms 107 at a point closer to the pivotal point of said arms than the front section of the straw-rack, it has a slightly shorter movement than the said front section; but this is compensated for by its being inclined somewhat in a downward and rearward direction, while the front section 89 occupies a position inclined rearwardly and upwardly, thus producing an elevated ridge or divide at the point where the sections 89 and 90 are connected with the operating-arms 107, over which the straw is compelled to pass. The front section 89, as is obviously necessary, overlaps the front end of the section 90 in order to prevent the straw from catching. By this peculiar construction the straw is subjected to a degree of agitation which is very effective in assisting all the valuable matter to be separated therefrom. The upward incline of the front section obviously to some extent retards the rearward passage of the straw which is accelerated by the downward incline of the next section. It follows that in passing over the divide the straw, which is necessarily to some degree intertangled, becomes forcibly torn asunder, thereby loosening it and permitting the heavy and valuable matter to gravitate to the slatted bottom, through which it escapes to the grain-pan below.

124 designates what I term the "fall-board," which is hinged to the under side of the deck of the casing and which inclines in a downward and rearward direction, its free edge being adapted to loosely engage the upper side of the section 90 of the straw-rack near the rear end of the latter, it being held from actual contact, however, by means of supporting-straps 125. Cleats 126 are also secured to the inner sides of the walls of the casing in order to limit the movement of the said fall-board in case the supporting-straps should break. The purpose of this fall-board is to prevent the air in front of it and between the straw-carrier of the casing and deck from passing to the fan, or, in other words, to prevent suction over the top of the straw-carrier. The weight of the fall-board bears against the air-pressure on its front side, said pressure being caused by the partial vacuum formed in rear of it by the action of the fan, to be hereinafter described. The fall-board being hinged, as shown, will permit the rack to force the straw under it, and the passing straw will prevent the passage of air between the rack and the fall-board. When straw is not passing under the fall-board, the latter will drop to the extreme limit permitted by the length of the straps, thus forming a reasonably close connection with the top of the rack.

The third or rear section 91 of the straw-rack has pivotal connection at its front end with the section 90 by means of a transverse shaft 127. The rear end of said section is supported by vertical arms or levers 128, the lower ends of which are fulcrumed at 129 to a cross-bar 130. The upper ends of said arms are connected by a shaft 131, transversely engaging the rear ends of the side pieces of the rack-section 91, the bearings in which are provided with adjusting-blocks 132, longitudinally adjustable, so as to compensate for wear. Set-screws $132^a$ are provided to retain said blocks in adjusted position.

Having now described the means for carrying the straw from the front to the tail end of the machine, I shall next proceed to describe the means for receiving the grain which is separated from the straw during its rearward passage and for conveying the same to the delivery end of the machine. This means I have called the "grain-pan," and the same is generally designated 133. The said grain-pan extends longitudinally through the greater part of the casing, its front end being extended beneath the threshing-cylinder and concave to the farthest possible point consistent with its longitudinal reciprocating motion. The said grain-pan is composed of side pieces 134, suitably connected at the ends, and provided with a grain-supporting bottom 135, which is composed of a plurality of upwardly and rearwardly inclined slats 136, so disposed that the rear end of each slat shall rest upon the front end of the slat next in rear thereof, thus forming an integral ridged bottom the ridges or slats of which by the forward movement of the grain-pan will be caused to slide under the grain supported thereon, which by the rearward movement of the grain-pan is pushed or conveyed in a rearward direction, as will be readily understood.

At a suitable distance above the grain-bottom 135 the grain-pan supports what I term the "separating-bottom" 137, the detailed construction of which will be best understood by reference to Figs. 17 and 18. Broadly stated, it may be said that this separating-bottom constitutes a screen the purpose of which is to separate the loose grain from the broken ears, short straw, and the like which finds its way to the separating-pan. The detailed construction of said screen will be hereinafter more fully described. The grain-pan is supported from cross-shafts 138 and 139, supported in bearings 140 and 141 upon the top of the casing and provided at their ends with arms 142 and 143, the lower ends of which have bearings 144 and 145, supporting the ends of shafts 146 and 147, which are mounted in bearings 148 and 149 upon the under side of the grain-pan and the ends of which project through slots 150 in the walls of the casing. The shaft 147, which is disposed about centrally under the grain-pan, is connected by means of pitmen 151 with the lower ends of the downward-extending arms 108 of the bell-cranks or castings 106, which have been hereinbefore described, and which thus serve to impart a longitudinal reciprocating movement to the said grain-pan. Flanges or cleats 142 are secured on the inner sides of the wall of the casing adjacent to the upper edge of the grain-pan for the purpose of preventing obstructions from entering between the latter and the sides of the casing. It will be observed that the lower arms 108 of the bell-crank are extended slightly in an outward direction to engage reduced portions or recesses 153 in the sides of the casing for the purpose of enabling the grain-pan to occupy the full width of the casing throughout.

It will be noticed that the shafts 146 and 147 support the front and central portions of the grain-pan only. The rear end of the grain-pan is supported by means of brackets or supporting-arms 159, which are preferably bent, as clearly indicated in Fig. 3$^b$ of the drawings, so that they may vibrate or operate freely without interfering with adjacent parts or with the frame or casing of the machine. The upper ends of these arms have pivotal connection with a shaft 156, extending transversely through bearings 157 upon the under side of the grain-pan. The lower ends of the arms 159 have similar pivotal connection with a shaft 158, which extends through boxes or bearings 155 upon the bottom of the casing. The grain-pan, it will be seen, is thus supported in such a manner as to vibrate freely. The bent supporting-arms in addition to supporting the grain-pan also serve for the purpose of forming a convenient connecting-point for one of the shoes of the separator, as will be hereinafter described.

The separating bottom or screen of the grain-pan is constructed of sheet metal, which is bent or corrugated, so as to form at suitable intervals a plurality of approximately vertical upright projections or ridges 162. In describing the exact construction or conformation of this screen-bottom one of these ridges may be taken as a starting-point. From the upper edge of said ridge the material of the screen is bent in a rearward direction to form a horizontal flange 163, which is doubled upon itself, as at 164, by passing the material of the screen in a forward direction to a point closely adjacent to the upper edge of the ridge 162. The material is then bent or inclined in a downward and forward direction, as at 165, and thence horizontally for a short distance, as at 166. At the forward termination of the horizontal portion 166 the material is bent upwardly at right angles to form the next ridge 162. It will thus be observed that the bottom may be described as having a plurality of equidistant transverse ridges provided at their upper edges with rearwardly-extending flanges, which said flanges in the process of construction are doubled, said ridges being separated by horizontal portions 166, disposed directly below the flanges 164 at their upper edges, and by intermediate inclined portions 165, which connect the horizontal portions with the upper rear edges of the flanged ridges. The horizontal portions 162 are provided with oblong or elliptical openings 167, which are disposed closely adjacent to the ridges 162 and which, as will be observed, are fully protected and covered by the flanges 162, which extend quite a distance beyond the said openings. This construction of the separating-bottom I deem an extremely important feature of my invention, inasmuch as thereby the loose grain will be thoroughly separated and permitted to pass to the grain-bottom below, while the short broken straw, ears, and parts of ears containing grain, and all trash will be carried rearwardly through the machine over the separating-bottom. The screen-openings are made oblong or elliptical, as shown, in order to enable the grain-pan to operate with equal efficiency upon all kinds of grain. If the machine were intended for the purpose of separating wheat only, the said openings might be reduced in size and might be made round instead of oblong without interfering with the efficiency of the operation, for the reason that the grains of wheat being short and plump would readily pass through such openings. As the machine, however, is intended to work upon all kinds of grain, I prefer to adapt the grain-pan in this manner to operate upon the larger grains, such as rye and oats, without the necessity for changing the grain-pan. As will be hereinafter described, I provide cleaning-screens which are interchangeable and to the action of which all grain delivered from the grain-bottom may when desired, although not necessarily, be subjected.

The sides of the grain-pan are extended some distance in rear of the grain-bottom, and the separating bottom or screen, supported between said sides, is likewise extended rearwardly beyond said frame-bottom. The obvious consequence is that the grain will be discharged from the grain-bottom at an earlier stage than the loose straw, broken ears, and the like will be discharged from the separating-bottom or screen. This is clearly important in order that the discharge from the grain-bottom and that from the screen may be kept separate, and provision is made for receiving the separate discharges, as will be presently set forth.

Upon the upper and under sides of the separating-bottom is mounted a plurality of partition strips or flanges 168 and 168$^a$, whereby the grain-pan is provided with a plurality of longitudinal compartments 169 and 169$^a$, the two outer ones of which receive the discharge from the ends of the separating-cylinder, while the intermediate compartments receive the grain which separates through the concave under the threshing-cylinder, through the inclined grate 45, through the rotary grate, and through the straw-rack. These partition-strips, the lower ones of which engage the bottom of the grain-pan, are securely connected by means of bolts 170$^a$ or other suitable means, whereby the corrugations of the separating-bottom are crushed, as will be clearly seen in Fig. 30, not sufficiently, however, to interfere in the least with the operation of the separating-bottom. The discharge from the ends of the separating-cylinder reaches the outer compartments 169 by way of inclined guide-boards 170, which are suitably disposed at the ends of said separating-cylinder to form hopper-shaped conduits for conveying the discharge from the separating-cylinder to the outer compartments of the grain-pan. By thus dividing the latter into a plurality of compartments the material to be separated is divided, and overcrowding at any particular point is not liable to occur.

In the practical construction of the grain-pan I prefer to construct it in two parts or sections, which are joined together about centrally close to the point at which the supporting-box 149 is located. It is obvious that the separating bottom or screen may be constructed of any desired number of pieces or sections. At the point where the sides of the frame or casing constituting the grain-pan are joined together, as indicated at 171, bolts or other suitable fastening means are employed, as shown at 172, for the purpose of detachable connection with said sides. This joint is to be formed directly in front of the supporting-shaft 147, thus enabling the front portion of the grain-pan to be detached when it shall be necessary to have access to the gearing of the fan-shaft or other parts of the machine which are disposed underneath said grain-pan.

With regard to the detailed construction of the joint 171 it may be stated that the meeting ends of the side section are to be tenoned together or overlapped in such a manner as to form a firm and rigid connection. Guard-plates, as 172, are also to be employed for the purpose of protecting the joint and forming a durable and effective connection. With regard to this and many other purely mechanical structural details of my improved machine it may be stated that while I have in the accompanying drawings to some extent illustrated the different modes of construction I do not by any means regard myself as limited to the precise structural details shown and described, but reserve the right to any mechanical equivalents within the scope of my invention.

The walls of the casing of the machine are connected directly under the rear end of the grain-pan by means of transverse frame-boards, forming a casing 174, in rear of which is pivotally mounted a deflecting-board 175, which is supported upon a shaft 176, one end of which extends through one of the side walls of the casing and is provided with an adjusting-lever 177, having a lock-dog 178, engaging a segment-rack 179, whereby the adjusting-lever and the deflecting-board operated thereby may be retained securely at its proper adjustment. The range of this adjustment embraces about ninety degrees of a circle, thus permitting the said deflecting-board to be adjusted practically at right angles to the position at which it is shown in Fig. 3$^b$ of the drawings, as will be seen by the dotted lines in said figure. It will be observed that when the deflecting-board is in the position shown by dotted lines its upper edge is supported upon the casing 174, and the grain discharged from the bottom of the grain-pan will pass in a rearward direction over said deflecting-board and onto a screen 180, carried in the shoe 181, the construction and arrangement of which will be described later. When the deflecting-board is in the position shown in full lines, the material discharged from the grain-bottom will strike the upper front side of said deflecting-board and be delivered thereby in a downward and forward direction and into the casing 182 of the grain-screw 183, which said casing is disposed transversely in the bottom of the separator-casing between a pair of transverse frame-pieces 184 and 185, which serve to support the said screw-casing, the upper end of which is open to receive the discharge from the grain-bottom as well as that from the cheat-screen 186, which is disposed slantingly, as shown, in the tail end of the machine, and which is provided with a suitably-constructed adjustable extension 186$^a$, which when desired may be extended in the direction of the tailings-screw, to be hereinafter described. The shaft 187 of the grain-screw is provided with suitable bearings in the walls of the casing, through one of which the said grain-screw extends, a chute 188 being provided to convey the discharge from said grain-screw into measures, sacks, or other receptacles suitably disposed underneath. The opposite end of the shaft of the grain-screw is provided with a pulley 189.

The casing of the shoe 181 is provided at its front end with a supporting-casting 190, having eyes 191, whereby it is connected pivotally with a shaft 192, supported in bearings 193 upon the under side of the grain-pan directly in rear of the bearings 157. The shoe 181, as stated, supports the screen 180, which is adapted to receive the discharge from the deflecting-board 175. This screen is mounted detachably in the shoe or casing, so that when desired it may be replaced by one of a different degree of fineness. The screens used in this shoe are all constructed precisely in the same manner as the separating bottom or screen of the grain-pan—that is, provided with transverse ridges having rearward-extending flanges and perforations adjacent to said ridges and disposed underneath, so as to be protected by the said flanges, which overhang said perforations. The sole difference will be in the fineness of the screen, which is governed by the size of the openings therein. In different screens the said separating-openings may also be placed at different distances apart, and they may be made of different shapes for different kinds of work. Thus different screens may be provided not only for the different kinds of grain to be operated upon, but said screens may also be specially adapted to the varying conditions of the grain. The sole difference between these cleaning-screens, however, will reside in the difference between the size and shape of the openings or perforations and the frequency with which they occur. These cleaning-screens, as will be readily understood, are interchangeable, only one being used at any one time, and the operation of the screen placed for the time being in the shoe or casing will be precisely identical with that of the screen-bottom in the grain-pan—to wit, the grain will be permitted to pass through the screen, while the trash is worked in a rearward direction and finally permitted to escape over the rear edge of the screen.

For the purpose of accelerating or retarding the discharge of material over the rear edge of the screen 180 the rear end of said screen may be mounted adjustably in recessed brackets 194, which are connected adjustably with the front end of the shoe by means of bolts 195 and thumb-nuts 196, said bolts engaging slots 197 in the said brackets, whereby the latter may be withdrawn in order to permit a screen to be removed or replaced whenever desired. These brackets are provided with a plurality of recesses 198, one above the other, which admit of the vertical adjustment of the rear end of the screen 180 for the purpose set forth.

The tail end of the shoe 181 is supported by means of bent arms 199, engaging a transverse shaft 200, which is mounted in bearings 201 upon the bottom of the casing of the machine, the upper ends of said arms being likewise pivotally connected with a shaft 202, mounted transversely in bearings 203 upon the under side of the shoe 181. The latter receives a reciprocating movement from the grain-pan, from the under side of which it is pivotally supported, as has been already described.

A second shoe or casing 204, constructed substantially like the shoe 181, is, like the latter, provided with supporting-castings 205, having eyes 206, which pivotally engage a transverse shaft 207, connecting the bent arms or rods 159, which serve to support the tail end of the grain-pan from the bottom of the casing. The tail end of the shoe 204 is supported pivotally by a shaft 208, which connects the arms 199, as shown, the distance between the shafts 208 and 202 being equal to the distance between the shafts 207 and 156, so that while the extent of the movement of the lower shoe 204 is less than that of the upper shoe 181 the said shoes will nevertheless be reciprocated in concert with each other and by the same operating medium—namely, the longitudinally-reciprocating grain-pan. The shoe 204, as already described, carries the cheat-screen 186, which is constructed of ordinary wire mesh and which overlaps an inclined guide-board 209, secured adjustably to the casing by means of a bolt and thumb-nut 210, accessible through a hand-hole in the side of the casing, having a door 210$^a$, and which serves to discharge the grain from the said screen into the casing of the grain-screw. The function of the cheat-screen is to separate from the grain any small wild seeds which may have become mixed therewith, as well as to separate from the grain any loose sand and dirt which may have found its way into the machine. The waste which shifts through the cheat-screen passes into the bottom of the casing in the path of the suction created by the fan, as will be hereinafter more fully described.

The walls of the casing of the machine support in rear of the discharge end of the separating bottom or screen of the grain-pan the cylindrical casing 211 of a right and left hand screw 212, the ends of which extend into casings 213 upon the outer sides of the walls, said casings being provided with bearings 214 for the shaft 215 of said screw, which is provided with set-collars 216 to retain it in the proper position in its bearings. The detail view, Fig. 26, of said screw shows the central dividing flange 217, which consists of a casting having a hub 218 mounted securely upon the shaft and connected by means of bolts, rivets, or in any other suitable manner with the spiral flanges which constitute the screw.

The ends of the right and left hand screw 212 discharge, as already stated, into the casings 213, which are provided with hand-holes 219, having covers 220, through which access may be had to the interior of said casing. These casings contain burs or grinding devices, which are for the purpose of subjecting the material fed thereto to attrition, whereby the grain which may still adhere to loose ears or broken portions of ears shall be removed in order that it may be finally separated from the trash. These burs or grinding devices are constructed in right and left hand patterns to fit the sides of the machine, as will be readily understood; but as in all other respects their construction is identical a description of one of said devices will suffice.

Each of the grinding devices then comprises a stationary member, which is secured to the wall of the casing, and a revoluble member, which is mounted upon the shaft 215. The stationary member comprises a flange 221, adapted to receive the bolts or other fastening means 222, whereby it is attached to the wall of the casing and provided with a plurality of inclined lugs 224, supporting the annular corrugated ring 225, which constitutes the bur of grinding-face. The rotary member of the grinding device comprises a housing or casting 226, having a hub 227, whereby it is secured upon the shaft 215, said hub being provided with tangential arms 228, while the housing or casting has an annular recess 229, forming a seat for the revoluble grinding member 231, which is provided with a plurality of inwardly-extending inclined lugs 230, coöperating with the lugs 224 to feed material to the grinding-burs, and also carrying a packing-ring 232, which, being thus secured to the bur member, engages the inner wall of the recess 229 to prevent grain or obstructions of any kind from entering the space between the said housing and the revoluble bur member. The connection between the housing and the revoluble bur member is effected by means of a plurality of lugs 233 upon the latter engaging corresponding slots or recesses 234 in the housing, the opposing faces of said housing and bur member being, furthermore, provided with sockets 235, in which are springs 236, tending to force the said members apart from each other. The lugs 233 are provided with transverse slots 237 to receive keys or fastening devices 238, which are provided with steps or shoulders 239, each of said keys being provided with a plurality of such steps or shoulders, either of which may be actively engaged, thereby enabling the revoluble bur member and the housing to be spaced any desired distance apart, and consequently at the same time enabling the distance between the faces of the stationary and revoluble bur members to be properly adjusted and regulated, as will be readily understood. In order to facilitate the adjustment of the parts, I provide the lugs 232 at their outer corners with transverse openings 240, adapted to be engaged by a pin 241, extending transversely from one of the limbs of a bifurcated wrench member 242, the other limb of which may be caused to press or bear downwardly upon the outer side of the housing or casing, which is thereby forced against the tension of the interposed springs in the direction of the revoluble bur member until the key 238 may be conveniently placed at the desired adjustment. It is obvious that by successively adjusting the several keys the distance between the members of the device may be very accurately and conveniently regulated.

The attaching-flanges 221 of the stationary bur members are provided with inwardly-extending flanges 243, which extend through the walls of the casing and which serve to support the ends of the casing 211 of the screw 212, which said casing may be riveted or otherwise secured to the said supporting-flanges.

Suitably secured to the periphery of the stationary housing of the revoluble bur member are a plurality of inclined wings or blades 245, consisting of segmental steel blades, riveted or otherwise suitably secured to the rim of said housing of the revoluble bur member. The housing 226 is provided with a hand-hole 247, covered by a slide 248, through which access may be had to the interior.

The walls of the casing of the machine are connected in rear of the screw-casing 212 and also in rear of the discharge end of the grain-pan by transverse boards, (designated 249, 250, 251, and 252,) the first of which is extended upwardly and forwardly under the section 90 of the straw-rack, where it is provided with an upward-extending flange 253, the principal function of which is to form a check to the suction of the fan. The several boards 249, 250, 251, and 252 are supported upon suitably-disposed cleats 254, as in an inclined deflecting-board 255, which is disposed between the lower ends or edges of the boards 251 and 252. A shaft 256 supports a hinged deflecting-board 257, the free edge of which may be placed in engagement with either of the boards 251 or 252. Said hinged deflecting-board is, furthermore, provided with a deflecting-flange 258, the free edge of which when the free edge of the deflecting-board 257 engages the board 251 engages the lower edge of the inclined deflecting-board 255, while when the hinged deflecting-board 257 is placed in engagement with the board 252 the said deflecting-flange will engage the upper edge of the deflecting-board 255. Slots or openings 259 in the walls of the machine-casing connect the bur-casings 213. One end of the shaft 256, which supports the hinged deflecting-board 257, extends through the casing of the machine and is provided with an adjusting-lever 260 and a lock-dog 261, adapted to engage a segment-rack 262, whereby the said adjusting-lever and the deflecting-board controlled thereby may be secured at any desired adjustment.

It will be understood from the foregoing that all material delivered to the screw 212 will be delivered from the ends of said screw into the bur-casings upon the side walls of the machine. Material thus delivered will be fed by the radial or tangential inclined lugs aided by the centrifugal action naturally arising from the rapid rotation between the corrugated faces of the stationary and the revoluble burs, being thus subjected to a degree of attrition which with positive certainty will remove every grain that may still adhere to loose or broken ears or which may in any way have become entangled with the loose straw or trash to an extent which has prevented its previous separation. After being subjected to this action the material is returned into the casing of the machine by the action of the inclined wings or blades 246, secured, as described, to the revoluble bur member, which operate to whirl or force the matter, including both grain and trash, through the slots or openings 259 and into the body of the machine, where it is confined between the boards 249, 250, 251, and 252 and the hinged deflecting-board 257. When the free edge of said hinged deflecting-board is in engagement with the board 252 and the flange 258 of said board engages the upper edge of the inclined board 255, the material received through the slots 259 will be deflected over the flange 258 and board 255 between the latter and the screw-casing 211 and onto the screen 180 in the shoe 181, which is disposed underneath the said screw-casing. Through this screen the grain will pass to the cheat-screen underneath, while the trash will escape over the tail end of the screen. Circumstances may, however, occur when it will not be found desirable to discharge the material acted upon by the burs to the cleaning-screen 180, but rather to subject it to a further separating operation. For this purpose I have provided what I term the "chaffing-screen" 263. This screen, which is principally used when the grain that is being operated upon is of such a nature that a large quantity of loose straw and trash reaches the tail end of the machine by way of the double screw 212 and its related parts, is supported at its front end by means of hangers 264 from the under side of the deck of the machine, where said hangers are connected with a shaft 265, mounted in bearings 266 directly in rear of the bearings 123. The rear or tail end of the chaffing-screen has pivotal connection with the arms 128, supporting the tail end of the straw-rack, and by means of which the necessary reciprocating movement is imparted to the chaffing-screen. The latter is provided with a plurality of rearward-extending fingers 267, over which the trash is discharged from the said chaffing-screen.

268 designates the tailings-screw, the casing of which, 269, is supported upon suitably-disposed curved arms 270. The said curved arms also support a pair of cross-pieces 130 and 271, the former of which has been already referred to as forming the pivotal support for the arms 128. Said cross-pieces serve to sustain and to reinforce the screw-casing and also to guide the tailings in the said casing, the top of which is open, as is usually the case. The shaft 272 of the tailings-screw is extended at both ends through the walls of the machine-casing, at one end through the elevator-casing 273 and at the opposite end through a branch 274 of the blast-pipe. The elevator-casing is of ordinary construction and is provided at its lower end with a chain-adjusting mechanism 276 of ordinary construction. Near its upper end the said casing is provided with bearings for a shaft 277, carrying sprocket-wheels 278, which coöperate with sprockets 279, mounted upon the shaft $272^a$, to support the endless carrier, which is composed in the usual manner of a chain 280, provided with cross-pieces 281, which serve to engage the interior of the elevator-casing and to convey the tailings to the discharge-spout 282 of said casing. This discharge-spout extends downwardly from the upper end of the elevator-casing and is connected with the wall of the separator-casing in such a position that the material discharged thereby will drop upon the separating-bottom of the grain-pan. This separating bottom or screen permits the grain to pass to the grain-bottom of the pan, from whence it is discharged either to the screen 180 or to the delivery-screw 183, while the trash is discharged from the separating-bottom to the screw 212, thence to the bur-casings, and, finally, if desired, to the chaffing-screen, from whence the trash eventually escapes.

The discharge-spout 282 of the elevator-casing is provided at its upper end with an opening 283 in its front side, said opening being covered by a hinged door-plate 284, the hinge-bar of which, 285, is provided with a forwardly-extending arm 286, carrying a counterweight 287, whereby the said door is held normally closed against flanges 288 to form a tight joint and prevent loose straw and dirt from entering between the edges of the door and the sides of the casing. This door is held closed with a sufficient degree of force to prevent it from opening under the impulse of grain, straw, and the like thrown against it by the action of the endless carrier of the elevator. It occasionally happens, however, that foreign substances—such as broken teeth, nuts, and the like—will find their way into the machine, and such foreign substances being forcibly thrown against the door-plate 284 will force the latter open, and will thus escape from the machine. I may here state that such foreign substances will be required to pass between the grinding-burs, which have been hereinbefore described. It will be remembered, however, that the revoluble bur member is mounted flexibly within a housing, between which and said bur member springs have been interposed. Said bur member will thus yield sufficiently to permit the passage of foreign substances without injury or danger of breakage.

290 designates the fan-casing, which is disposed horizontally underneath the bottom of the casing of the machine, where it is supported by the sills and framework of the casing. The fan-casing may be said to include in its structure the inlet spout or duct 291, whereby it is connected with the tail end of the machine, and which discharges centrally into the bottom of the fan-casing proper, the bottom of which, 292, is provided with a central opening 293, which receives the discharge from said spout or inlet. The fan-shaft 294 has bearings in the bottom of the inlet-spout 291 and in the top of the fan-case, where suitable sleeves are provided, constituting said bearings. The said shaft is provided near its lower end with a collar 295, bearing against the upper edge of one of said sleeves, which is designated 296. The lower end of the shaft is additionally supported upon a spider 297, resting upon a suitably-disposed truss-rod 298. The fan-shaft carries a hub 299, provided with radiating arms 300, to which the blades 301 are suitably bolted or otherwise secured, said blades being reinforced by braces 302, whereby they are connected with an auxiliary hub 303 upon the fan-shaft. Said arms are incased by a funnel-shaped sheathing 302$^a$, forming a deflector, whereby the straw, &c., is directed to the blades of the fan. Oil-cups 304 are provided, from which lubricant may be conveyed through suitably-disposed pipes 305 to the different bearings of the fan-shaft. One of these bearings comprises a flanged disk 306, which accommodates the gear-wheel 307 at the upper end of the fan-shaft, and which meshes with a bevel-gear or pinion 308 upon a shaft 309, mounted in suitable bearings upon the framing of the machine. Said shaft also carries at its outer end a band-wheel 310, connected by a belt 311 with a pulley 312 upon the shaft 20 of the threshing-cylinder, from which the fan is thus directly driven, the belt 311 being crossed to insure the rotation of the fan in the proper direction. The end of the cylinder-shaft which carries the pulley 312 also carries a pulley 313, through the medium of which it receives motion from the source of power.

Material which passes from the tail end of the machine through the spout or duct 291 and into the fan-casing enters the eye of the fan and is delivered at the periphery of the latter into the blast-pipe 314, which is provided at its lower end with a door 315, through which access may be had to the interior of the blast-pipe and fan-casing. The blast-pipe occupies an inclined position upon the side of the casing of the machine opposite to that which carries the elevator-casing, and said blast-pipe connects at its upper end with the elbow 316 of the discharge-spout 317, which said elbow is swiveled in the usual manner in order to permit the discharge-spout to be adjusted to deliver the straw in any desired direction. The discharge-spout, which is to be composed of several sections telescoping together, as is usually the case, has not been illustrated in detail in the accompanying drawings; but I have shown at the front end of the casing of the machine a bracket 318, adapted to support the stacking-spout when the latter is swung around over the top or deck of the machine-casing, as is usually done during transportation.

The upper end of the eduction-spout 314 connects with the upper end of the spout or casing 274, which, as previously described, communicates with the casing of the tailings-screw. The said upper end of the eduction-spout is bent or curved upwardly to communicate with the elbow 316, and within it are placed a plurality of flanges 319, which coöperate to form a grating, the said flanges being curved upwardly, as shown, to conform to the contour of the spout. The lower or front ends of the flanges or grate-bars 319 are downwardly inclined or beveled to the level of the adjacent portion of the wall of the tubular duct 314, so as to offer no obstruction to material passing through the said duct to the elbow 316 and the discharge-spout. The grate-bars 319 are provided with laterally-extending flanges 320 to receive rivets 321, by means of which they are secured in position. 322 indicates the inclined or beveled front ends of the grate-bars.

It will be noticed that the inclination or bevel of the centrally-disposed grate-bars is more gradual than the inclination or bevel of the grate-bars disposed toward the outer sides. This is for the obvious reason of facilitating the admission between said grate-bars of the finer and heavier matters, which naturally seek the lowest level, while a comparative obstacle is opposed to the passage of the straw and lighter matters, which, however, are not obstructed, but simply momentarily excluded to enable the desired separation to take place.

It is obvious that any material passing through the eduction-spout 314 is in a state of more or less violent agitation. At the same time the heavier particles of such material, necessarily including any grain contained therein, must naturally settle to the bottom, and will consequently be intercepted by the upwardly-curved grating composed of the bars 319. Said bars are sufficiently spaced to permit grain or bits of ears containing grain to drop into the spout or casing 274 and through the latter to the tailings-screw, whereby it is carried to the elevator, from whence it is conveyed to the separating-screen of the grain-pan, as hereinbefore described.

For the purpose of admitting and regulating the admission of air to the fan-casing in order that the suction developed by the fan may be properly governed I provide a series of valves 324, which are mounted upon shafts 325, extending transversely through the casing of the machine and mounted in suitable bearings in the walls thereof. These valves are mounted in the lower part of the casing and in the rear of the fan-casing between the latter and the grain-delivery screw 183, the sides of the casing being provided with openings 326 in front of said valves for the admission of the necessary air. Similar valves 327 are disposed upon shafts 328, which are journaled in the walls of the separator-casing in rear of and above the top of the fan-casing, which is extended so as to form what may be described as a horizontal partition 329. The walls of the separator-casing have openings 330 to afford access to oil-cups and the like. Valves 324 are provided with arms 331, connected by pivoted rods 332, so that the said valves shall move in unison. The valves 327 are likewise provided with arms 333, connected by pivoted rods 334, so that the said upper valves shall likewise move in unison. The shaft 325 of one of the lower valves is provided with an arm 335, carrying an adjustable weight 336, which operates to retain the said valves normally in an open position, said valves being composed simply of flat boards or sheets of metal, which are inclined from their respective shafts in a downward and forward direction. It is obvious that when suction exercised by the fan causes air to enter through the openings 326 the air, impinging upon the valve-boards, will tend to force the latter in a downward or closed position. It will be observed, however, that the valves are not sufficiently large to form an absolutely tight closure, as air must always be admitted even when the machine, including the fan, is running at a maximum rate of speed, owing to light feed or from any other cause.

The shaft 325, which carries the weighted arm 335 at one of its ends, extends at its opposite end into a casing 337, which contains what I term a "regulator-valve" 338, which is mounted upon an arm 339, rigidly connected to the said shaft 325. Said shaft 325 also has an arm 340, which is connected by a link 341 with an arm or crank 342, extending from the shaft 328 of one of the valves 327. The latter valves are thereby caused to move in unison with the valves 324. The top of the casing 337 has an opening 343, the exit through which is controlled by a gravity-valve 344, seated in said opening. A bracket 345, disposed above said opening, has an adjustable stop 345$^a$ to limit the upward movement of the valve 344. The casing 337 is segmental in shape, being concentric with the shaft 325, upon which the regulator-valve is mounted, said regulator-valve being fitted within the said casing so closely that air will be permitted to filter slowly past the sides thereof. It follows that the said valve will move freely in an upward direction, the air contained in the casing being permitted to escape through the opening 343, while the movement of said valve in a downward direction will be retarded by the air contained in the casing 337 below said valve. This device simply constitutes a governor to control the operation of the valves.

The valves 324 and 327 are supplemented by an additional valve, which constitutes what I term a "relief-valve," which is disposed upon the deck of the separator-casing near the rear end of the latter. Said relief-valve comprises a casing 346 of suitable construction, which is built over and around an opening 347 in the casing of the machine and which is provided with a hinged door 348, opening inwardly and which constitutes the valve proper. The hinge-rod of said door or valve is provided with arms 350, carrying adjustable weights 351, which serve to retain said valve normally in a closed position, the weights 351 being adjustable in order to determine the point at which said relief-valve shall open under the pressure of the air impinging thereon or, in other words, when the section behind the valve reaches a point at which the external air-pressure shall be sufficient to overbalance the weights 351. As shown in the accompanying drawings, this relief-valve is disposed above the straw-rack not far from the rear end of the latter, the location being chosen in such a manner that the material passing over the straw-rack shall not come under the influence of the suction of the air entering through the relief-valve until it reaches the point at which it leaves the straw-rack.

It will be understood from the foregoing description that the normal position of the valves 324 and 327 is wide open, while the relief-valve is entirely closed. Previous to starting the machine the operator will adjust the counterweights of the valves according to the kind and quality of grain that is to be operated upon, the proper adjustment being readily learned or determined by experience, although it is obvious that if the initial adjustment does not prove to be correct it may be readily changed. The aim of the operator is obviously to admit just the sufficient quantity of air to supply the fan and nothing in excess thereof. Now let the machine be started in operation. As the fan starts and increases in speed to gain its regulation speed the air naturally increases in speed and volume through the open spacing between the valves 324 and 327, which causes them to begin to close from the increasing pressure of air. When the fan has gained its regulation speed, the said valves should have closed half-way—that is to say, to the extent of one-half the limit of their movement. This is the position desired for them by the operator. When these valves have attained this position, the relief-valve has opened sufficiently to supply the additional amount of air required by fan—that is, the air which is not permitted to pass through the valves 324 and 327. It will be noted that the air-pressure upon the latter valves tends to close them against the pressure of the adjustable weight, while the air-pressure upon the relief-valve tends to open it against the pressure of the adjustable weight on its arms, the relief-valve in this sense always acting contrary to the valves 324 and 327.

Of course it will be understood that when a light draft of air is required, as for seeds of any light grain, the adjusting-weights upon the arms of the respective valves will be so disposed as to permit the valves to be more readily influenced by the air-pressure than when heavier grain is to be operated upon. The valves being thus influenced by the lighter pressure of air will yield more readily to the increased volume of air and the valves 324 and 327 being thus more readily closed to the admission of air the relief-valve will be correspondingly more readily opened to the admission of air, so that under any circumstances the required volume of air will be supplied to the fan.

If for any reason, such as light feeding, the fan should speed above the regulation, the valves 324 and 327 will close more than half-way, owing to the increased air-pressure. By thus closing they cut out from the shoes and screens the volume of air which would be more than the screens, &c., would require for the cleaning of the grain thereon. To admit an excess of air at such a time would be undesirable, as it would tend to draw the grain past the end of the shoes, thus causing waste. At the same time while the valves 324 and 327 are designed to cut out an excess of air the relief-valve will open to an extent which permits the admission of a sufficient volume of air for the supply of the fan, it being understood that the only duty required of the fan to prevent it from running in vacuum is to actuate the said valves. If, on the other hand, the fan for any reason, such as overfeeding of the machine, should fall below regulation speed, the valves 324 and 327 will open more widely, owing to the decrease in air-pressure, thus supplying more air for the purpose of maintaining the necessary volume over the shoes and screens, and while the decrease in air-pressure causes the said valves 324 and 327 to open more widely than heretofore the same law causes the relief-valve to close to a corresponding extent.

It is well understood that grain-separators cannot be operated at a permanent regulation speed, owing to the fact that the feed to the threshing-cylinder is more or less irregular. By my improvement it will be seen that the difficulty usually caused by variable speed is completely overcome. When the machine is crowded and the speed of the fan falls below regulation, an increased volume of air is admitted over the shoes and screens where at such a time it is urgently needed in order to effect the cleaning of the grain. On the other hand, when the speed of the fan increases the amount of air admitted over the shoes and screens is reduced, thereby avoiding danger of waste by grain being blown over the screens.

As to the operation of the device, it will be urderstood that while the grain and chaff is especially operated upon by the air passing longitudinally through the casing of the machine from the valves 324 and 327 the straw comes under the special influence of the air entering through the relief-valve. As the straw falls from the straw-rack upon the fingers 227 it passes directly into the current of air entering through the relief-valve, and at this point the two currents of air merge and pass in a downward direction into the duct 291 and through the latter to the fan-casing, the straw and trash being thus disposed of, while the separation of the grain is thoroughly effected, as has been hereinbefore described.

The regulator-valve, which has been hereinbefore described as being connected with the valves 324 and 327, acts as a governor to prevent the said valves from being too suddenly operated in the event of the speed of the fan being very suddenly increased or checked, as the case may be. In either case the opening or closure of the valves will not take place suddenly, but it will be controlled by the regulator-valve, which, as hereinbefore described, is compelled to descend into its casing slowly and gradually while the air contained in the lower part of the case in said vacuum-valve filters past the edges of said valve. By the construction and arrangement of parts which has been described herein the regulator-valve is connected with and controls the movement of the valves 324 and 327, which will be governed accordingly.

In the construction of my improved grain-separator there are details which have been shown in the accompanying drawings, but which, while they may be expedient and even necessary, are not to be considered as parts of the invention. Thus I refer to foot-boards, such as 352, upon which the attendants may be stationed during the operation of the machine; likewise a suitably-constructed rack 353 under the tail end of the machine, upon which screens of various kinds may be stored for transportation. Likewise do I refer to the construction of the casing with hinged doors, as 354, at the tail end, for the purpose of rendering access to the interior of the machine easy and convenient. Again, I have shown in Fig. 31 of the drawings a form of a hanger-frame which may be preferably used throughout the construction of the machine where supporting means for vibrating devices—such as the straw-rack, the grain-pan, the screens, &c.—are required. I have generally described such supporting means as being composed of side arms, pivotally connected with supporting-shafts extending under the device to be supported or resting upon supporting means, such as the bottom of the casing. By the construction shown in Fig. 31 I have availed myself of a frame 360, which may be rectangular or any other suitable shape and which embodies in its construction two parallel shafts 361 361 and two flattened side pieces or arms 362 362, the entire frame being manufactured in a single piece. It will be readily understood that when hanger-frames of this construction are used they may be readily adjusted by mounting the shafts thereof in boxes suitably constructed and provided for the reception thereof.

Details like the foregoing will be readily understood and appreciated by those skilled in the art to which my invention appertains; but I do not deem it necessary to make further detailed description of said alterations and modifications.

From the foregoing description, taken in connection with the drawings hereto annexed, the operation and advantages of my invention will be readily understood. The threshing is performed in the usual manner by feeding the grain between the cylinder and concave, the adjustability of the latter being such as to permit the machine to be lightly or heavily fed, according to the nature and the condition of the grain that is being operated upon. Be it understood that this machine is intended and adapted to operate practically upon all kinds of grains and seeds, the separating bottom or screen in the grain-pan being provided with openings of a size and shape that will adapt it to operate with equal success upon large, small, and differently-shaped grains or seeds and without regard to their specific gravity, while the separating-screen employed near the tail end of the machine is interchangeable and is constructed with openings of a size and shape and at a distance apart that will specially adapt the said separating-screen to the special kind of grain or seed that is to be operated upon. Thus it will be seen that by simply changing the separating-screen the machine may in a few moments be adapted to operate upon any kind or variety of grain or seed—such as wheat, rye, oats, barley, millet, timothy, flax, or any other variety that may be encountered—the general construction of the machine being such that it will operate with equal efficiency upon all kinds and conditions.

As has been already stated, a very large proportion of the loose grain and seeds will be separated from the straw at the point of threshing—that is, between the concave bars and between the bars of the inclined device directly in rear of the concave. The force with which the straw and grain are discharged in a rearward direction will serve in a sense to separate the grain or the parts which are rendered heavy by the adhesion of grain from the straw, the heavier matter entering between the tangential blades of the separating-cylinder, to be eventually discharged through the open heads or ends of the latter onto the separating bottom or screen of the grain-pan. The straw, on the other hand, will drop upon the rotary grate and will be passed between said grate and the separating-cylinder in a rearward direction onto the straw-rack.

Be it understood at this point that the separating-cylinder and the revolving grate are speeded unequally, the former rotating at a much greater rate of speed than the latter. It follows that the straw in its passage between the said elements is subjected to a combing or disentangling action, which is materially assisted by the tangential arrangement of the blades of the separating-cylinder. This disentangling, combing, or loosening action greatly assists in permitting loose grain (under which head is included all loose ears or fragments thereof as well as bits or material rendered heavy by the adhesion of grain) to pass through the grate at the lower end of the straw-rack and directly below the separating-cylinder. It is also obvious that this action is largely assisted by the reciprocating movement of the straw-carrier or straw-rack.

The grain which is separated from the straw during the passage of the latter over the straw-rack drops upon the separating-screen of the grain-pan. The construction of this screen has been already described, and it will be observed that it is of such a nature as to render it practically impossible for grain to pass over said screen without passing through the perforations therein and onto the grain-bottom. At the same time it will be seen that the loose and broken straw which has been permitted to pass onto the separating-bottom with some degree of liberality in order that all grain may be extricated will not be liable to pass through the said separating-screen. It is true that chaff and very small bits of straw and broken ears will pass through the openings in the screen, which, as described, are of a size sufficient to permit the passage of the very largest grains that may be operated upon; but the passage of trash is prevented, not only by the fact that the grains, which are heavier than the trash, will naturally seek the lower level and consequently keep the trash away from the screen-openings, but also by reason of the flanges which overhang the said screen-openings, and thus prevent the light trash from having access thereto, and at this point I desire to call especial attention to a very important feature of my invention, which lies in the fact that the separating-screen is not subjected throughout its length, or even a portion thereof, to an upward blast from a fan. It is this upward blast which in many machines of ordinary construction is conducive to the loss of grain, inasmuch as in order to render the blast sufficiently strong to separate the straw, chaff, and worthless particles it is frequently made sufficiently strong to cause grain, especially when imperfectly separated, to be carried away with the trash. It is true that many means have heretofore been provided for the purpose of saving grain thus blown over the tail end of the separating-screen; but it is also true that this has heretofore been imperfectly done, a greater or lesser percentage of grain being invariably blown over the tailings-saving device of whatever nature the latter may have been.

It will be seen, then, that by the construction and arrangement of the grain-pan in my improved machine a very large proportion or percentage of the grain reaches the grain-bottom of the pan in a comparatively clean state. Conditions may exist when the grain reaching the grain-bottom will be practically clean and free from trash. Under such conditions it may be discharged directly from the grain-bottom to the delivery-screw, thus saving a considerable amount of work. Under other conditions it may be found necessary to deliver from the grain-bottom over the deflecting-board 175 to the cleaning-screen 180, in which event the grain will be exposed to the suction from the fan while passing over said screen and through it to the cheat-screen whereby the grain, now thoroughly free from all light and trashy matter, will be discharged into the casing of the delivery-spout.

It is obvious that when the deflecting-board is tilted so as to cause the grain to be delivered from the grain-bottom direct to the casing of the delivery-screw the grain will likewise be subjected to the suction of the fan, which serves to separate the chaff and trash before the grain reaches the delivery-spout. In either case it will be understood that any grains that may be carried out of the path of proper delivery will drop upon the cheat-screen which discharges to the delivery-spout and that if the suction should be sufficient to carry any portion of the grain beyond the range of the cheat-screen it will, with practical certainty, be carried to the casing of the tailings-screw, from thence to the elevator, and thence to the separating-bottom of the grain-pan. It will be observed that none of the tailings need ever be returned to the threshing-cylinder, thereby avoiding the use of the very long elevator-casing which it is usually found necessary to employ.

The matter which has been permitted to pass through the straw-rack onto the separating-screen is discharged from the latter into the casing 211 of the right-and-left screw 212, from whence it is conveyed into the bur-casings upon the sides of the machine, where the material is subjected to an attrition which is of such a nature as to render it absolutely efficient in separating the grain from the loose or broken ears to which it may still adhere. From the bur-casings the material is returned into the separator-casing, sometimes to the cleaning-screen 180, through which the grain is separated and caused to pass by way of the cheat-screen to the delivery-screw, but usually to the chaffing-screen, through which the grain and chaff pass to the cleaning-screen, while the straw and larger trash pass over the fingers 267 and into the path of the direct suction from the fan. It will be observed that the discharge-fingers 267 are disposed directly above the tailings-screw. Consequently even at this stage separation and saving of grain will take place.

It will have been noticed that the greater number of air-inlet valves are disposed in the space below the top of the fan-case, while the lesser number are disposed between said top and the bottom of the grain-pan. This I find is the most advantageous distribution and the one which is most conducive to the thorough separation and saving of grain. By this arrangement all the material passing over and through the chaffing-screen, the cleaning-screen, and the cheat-screen is subjected not to the blast from underneath, which, while effective in separating the trash, has been found no less effective in carrying the lighter grains to or over the tailings-saving device, but to a suction from above, which can practically have no effect upon the grain upon the said screens or passing from one to the other of said screens. The trash becomes mixed with the straw, which on passing over the tail end of the straw-rack enters the path of suction and is carried through the duct or spout provided for the purpose into the fan-casing, being discharged into the eye of the fan. The latter discharges into the eduction-spout, through which the straw in a state of violent agitation is carried to the discharge-spout. The conditions, however, under which the straw passes through the eduction-spout are such that any grains which may still remain will be forcibly thrown to the lower part of said spout and be intercepted by the grating at the upper end of the latter, passing through said grate into the spout or casing 274 and through the latter to the casing of the tailings-screw, thus rendering it practically impossible for any portion of the grain to be wasted by being finally discharged through the discharge-spout of the machine. It will thus be seen that the entire construction and arrangement of the parts constituting my improved grain-separator are of such a nature as to fit it in the best possible manner for the object in view—namely, to avoid any possibility of the loss of any proportion of the grain, however small. This result, I believe, has been effected in a simple convenient manner, the general construction being such as to produce a machine which is light running and easily handled.

I have in the foregoing described a simple and preferred form of my invention; but I desire it to be distinctly understood that I do not limit myself to the structural details herein shown and described, inasmuch as numerous changes and departures from the construction shown might be made by those skilled in the art without detracting from the utility of the device. I therefore reserve to myself the right to any changes, alterations, and modifications which may be resorted to without departing from the spirit and scope of my invention.

Having thus described my invention, I claim—

1. In a grain-separator, the combination with threshing mechanism, of a separating-cylinder located in the path of the material discharged by the threshing mechanism, said cylinder having an exterior surface formed by a plurality of relatively overlapping slats spaced apart and disposed tangential to a circle of smaller diameter than said cylinder, and open ends spaced from the walls of the casing and communicating with ways for the passage of its contents to the interior of the separator.

2. In a grain-separator, the combination with threshing mechanism, of a separating-cylinder disposed in rear of and receiving the direct discharge from the threshing mechanism, said separating-cylinder having open ends spaced from the walls of the casing and an exterior surface formed by spaced overlapping blades.

3. In a grain-separator, the combination with threshing mechanism, of rotary separating means located in rear of and exposed to the impact of material discharged directly from said threshing mechanism, said separating means consisting of a receiver having open ends spaced from the walls of the casing, and an exterior surface composed of obliquely-disposed slats spaced apart and overlapping each other.

4. In a grain-separator, a separating-cylinder disposed in rear of and preceding the direct discharge from the threshing-cylinder, said separating-cylinder having openings for the passage of grain and material rendered heavy by the adhesion of grain into the interior thereof, open ends for the discharge of said material, and an intermediately-disposed dividing-ring.

5. In a grain-separator, a separating-cylinder disposed in rear of and receiving the direct discharge from the threshing-cylinder, said separating-cylinder having blades disposed tangentially to a circle of smaller diameter than said cylinder, open ends, and an intermediately-disposed dividing-ring.

6. In a grain-separator, a casing having a contracted throat, threshing mechanism in said throat, and a separating-cylinder mounted in the casing directly in the path of material discharged from the threshing mechanism, said separating-cylinder being of a length exceeding that of the threshing-cylinder and having an exterior surface consisting of blades disposed tangentially to a circle of smaller diameter than said cylinder.

7. In a grain-separator, a casing having a contracted throat and an auxiliary casing in rear of said throat but exceeding the width of the latter, in combination with threshing mechanism mounted in the throat, and a separating-cylinder disposed in rear of the threshing mechanism, directly in the path of material discharged from the latter, said separating-cylinder having sides open for the reception and ends open for the discharge of grain and finer particles, the ends of said separating-cylinder being extended through the auxiliary casing.

8. In a grain-separator, a separating-cylinder comprising a plurality of blades disposed tangentially to a circle of smaller diameter than said cylinder, and means for connecting and supporting said blades, which latter form the exterior surface of the separating-cylinder, in combination with a threshing-cylinder disposed in front of said separating-cylinder, said threshing-cylinder being much shorter than the separating-cylinder and adapted to discharge and diffuse the threshed material violently against the face of the separating-cylinder, the latter being rotated at a high rate of speed, but less than the rate of rotation of the threshing-cylinder.

9. In a grain-separator, the combination with threshing mechanism, of a separating device located in rear of and exposed to the impact of material discharged directly from said threshing mechanism, said separating device comprising a cylindrical rotary structure having open ends and an exterior surface composed of obliquely-disposed slats overlapping each other and disposed tangentially to a circle of smaller diameter than said cylinder, said separating-cylinder being rotated in the same direction as the threshing-cylinder and at a high rate of speed, the slats presenting on the downgoing side of the cylinder the outer edges of said slats and the widest portion of the interspaces toward the threshing-cylinder.

10. In a grain-separator, a separating-cylinder having blades disposed tangentially to a circle of smaller diameter than the cylinder, and open ends, said cylinder being disposed to discharge material between its ends and the walls of the separator-casing, in combination with auxiliary-casing means serving to direct such discharge in a downward direction, and a grain-pan disposed below to receive such discharge.

11. In a grain-separator, a threshing-cylinder and an open-ended separating-cylinder disposed in rear of and receiving the direct discharge from the threshing-cylinder and having an exterior surface formed of slats tangentially to a circle of less diameter than the cylinder and between which grain and material rendered heavy by the adhesion of grain may be passed into the interior of said cylinder, in combination with a rotary grate disposed in front of the lower part of said separating-cylinder and revolving in an opposite direction to the latter.

12. In a grain-separator, a separating-cylinder disposed in rear of the threshing-cylinder and provided with blades tangential to a circle of less diameter than the cylinder and with braces secured at one end to said blades to prevent the admission of long straw between the latter.

13. In a grain-separator, an open-ended separating-cylinder disposed in rear of the threshing-cylinder and provided with blades tangential to a circle of smaller diameter than the cylinder and with braces secured to said blades to prevent the admission of long straw.

14. In a grain-separator, a separating-cylinder disposed in rear of the threshing-cylinder and having blades disposed tangentially to a circle of smaller diameter than the cylinder and staggered cross-braces to prevent the admission of long straw, said cross-braces having free ends normally out of contact with the blades adjacent to the ones to which they are secured.

15. In a grain-separator, a separating-cylinder having blades tangential to a circle of smaller diameter than the cylinder and V-shaped cross-braces secured to said blades.

16. In a grain-separator, a separating-cylinder having blades tangential to a circle of smaller diameter than the cylinder and V-shaped cross-braces secured to said blades and having free vibratory arms.

17. In a grain-separator, a threshing-cylinder, a separating-cylinder disposed in rear of the threshing-cylinder and having open delivery ends and sides open to the admission of grain and finer particles, and a centrally-disposed annular partition.

18. In a grain-separator, a separating-cylinder having open discharge ends and a centrally-disposed dividing-ring, in combination with an auxiliary casing to direct the discharge from said cylinder in a downward direction, and a receiving-pan having separate compartments to receive the discharge from the ends of said separating-cylinder.

19. In a grain-separator, the combination of threshing mechanism, a separating-cylinder of greater length than the threshing-cylinder disposed in rear thereof and having obliquely-disposed overlapping slats and open discharge ends, passages for conducting the matter discharged from the separating-cylinder to the said grain-pan, and an intermediately-disposed grate inclined from the concave in an upward and rearward direction toward the separating-cylinder.

20. In a grain-separator, the combination of a threshing-cylinder, a concave, a separating-cylinder of greater length than the threshing-cylinder disposed in rear thereof and having an exterior surface composed of slats tangential to a circle of a smaller diameter than the cylinder, and open discharge ends, a grain-pan, passages for conducting the matter discharged at the ends of said separating-cylinder to said grain-pan, an intermediately-disposed grate extending from the concave upwardly and rearwardly in the direction of the separating-cylinder, and a rotary grate disposed between the latter and the upper end of the inclined grate.

21. In a grain-separator, a threshing-cylinder, a separating-cylinder disposed in rear of the threshing-cylinder and having an exterior surface composed of blades disposed tangentially to a circle of smaller diameter than the cylinder, and open discharge ends, an auxiliary casing directing the discharge of said separating-cylinder in a downward direction, a rotary grate disposed to coöperate with the separating-cylinder to feed the straw in a downward direction, and a reciprocating straw-rack having its front end extended under said separating-cylinder.

22. In a grain-separator, the combination of threshing mechanism, a separating-cylinder disposed in rear of the threshing-cylinder and in the path of material discharged therefrom, said separating-cylinder having open discharge ends and an exterior surface composed of obliquely-disposed overlapping blades tangential to a circle of smaller diameter than the cylinder, said slats being spaced apart for the admission into the interior of the cylinder of grain and finer particles, and a rotary grate coöperating with the separating-cylinder to feed in a downward direction and under the said separating-cylinder the straw and coarser particles intercepted by the latter.

23. In a grain-separator, a casing having a contracted throat, threshing mechanism disposed in said throat, a separating-cylinder having open ends extending through the side walls of the auxiliary casing and communicating with the spaces between the latter and the outer casing, said separating-cylinder having side openings for the passage of grain and finer particles to be discharged at the ends thereof and said separating-cylinder forming an obstruction to the passage of straw and coarser particles, a rotary grate coöperating with the separating-cylinder to feed straw and coarser particles rearwardly under said separating-cylinder, and a reciprocatory straw-rack reduced at its front end and extending between the sides of the auxiliary casing below and in front of the separating-cylinder.

24. In a grain-separator, a separating-cylinder having open discharge ends disposed between the sides of an auxiliary casing, a reciprocatory straw-rack reduced at its front end and extending between the sides of the auxiliary casing below and in front of the separating-cylinder, and shelves disposed in rear of the separating-cylinder above the straw-rack to cover the spaces adjacent to the latter exposed by the movement thereof in a rearward direction.

25. In a grain-separator, a separating-cylinder having open discharge ends and disposed between the sides of an auxiliary casing, a reciprocatory straw-rack having reduced sides at its front end extended between the sides of the auxiliary casing in a forward direction below the separating-cylinder, and means for preventing material from passing between the reduced sides of the straw-rack and the walls of the casing.

26. In a grain-separator, the combination with the frame or casing of the machine, of a separating-cylinder having open discharge ends, and an auxiliary casing comprising in part flange-bars secured to the side walls of the main casing and having flanges extending over the rear portion of the separating-cylinder, and a cross-bar secured under the deck of the main casing and having a flexible guard-strip.

27. In a grain-separator, a separating-cylinder comprising rings provided at their inner edges with laterally-extending annular rims and provided on their sides with flanges tangential to a circle of smaller diameter than the cylinder, connected at their inner ends with said rims, in combination with slats or blades secured to said flanges and supported at their inner edges against the annular rims.

28. In a grain-separator, a separating-cylinder comprising heads consisting of rings provided at their inner edges with laterally-extended annular rims and with flanges tangential to a circle of smaller diameter than the cylinder, an intermediate supporting-ring provided at its inner edge with oppositely-extending annular rims and provided at the sides thereof with flanges tangential to a circle of smaller diameter than the cylinder and having slots adjacent to said flanges, the slats or blades having centrally-disposed slots engaging the slots of the intermediate supporting-ring, said blades being permanently secured to the flanges of the intermediate supporting-ring of the end rings or heads.

29. In a grain-separator, a separating-cylinder having open ends, and exterior surfaces composed of blades tangential to a circle of smaller diameter than the cylinder and an intermediate supporting-ring engaging said blades, in combination with a partition consisting of an annulus secured to said intermediately-disposed supporting-ring.

30. In a grain-separator, a reciprocatory rack comprising front and rear sections, oscillatory operating-arms, pivotal connecting means between said straw-rack sections and the ends of the operating-arms above the fulcra of the latter, the rear section being connected with said arms at a point less remote from the fulcrum than the front section, thereby imparting to the said front and rear sections strokes of unequal length.

31. In a grain-separator, a reciprocatory straw-rack comprising front and rear sections, a rock-shaft having upwardly-extending oscillating operating-arms, pivotal connecting means between said front and rear sections and the upwardly-extending operating-arms, the rear section being connected with said arms at a point less remote from the axis of the rock-shaft than the front section, said pivotal connecting-points being elevated above the receiving-point of the front section and also above the discharge-point of the rear section, thereby forming a raised portion or divide.

32. In a grain-separator, a reciprocatory straw-rack comprising sections or members pivotally connected with oscillating operating-arms at points above the fulcra of said arms and elevated above the respective receiving and discharge ends of said sections, the rear section being overlapped by the front section of the rack.

33. In a grain-separator, a straw-rack comprising reciprocatory sections and oscillatory operating-arms having pivotal connection above their fulcra with the adjacent ends of said sections, the front section being connected with said operating-arms at points more remote from the fulcra than the rear section, and overlapping the latter.

34. In a grain-separator, the combination with a reciprocatory straw-rack, of a fall-board hinged under the deck of the casing, straps supporting the free end of said dividing-board, and auxiliary means to positively limit the extent of the upward and downward movements of the latter.

35. In a grain-separator, a reciprocatory grain-pan having a screen provided with longitudinally-disposed dividing-strips, in combination with a grated concave discharging into the middle compartments only, a separating-cylinder discharging into the outer compartments only, and a straw-rack having a grated bottom discharging into all the compartments formed by the dividing-strips upon the separating-screen of the grain-pan.

36. In a grain-separator, a reciprocatory grain-pan having a grain-bottom and a separating-bottom extending in rear of the grain-bottom, a cleaning-screen and a delivery-screw disposed underneath the discharge end of the grain-bottom of said grain-pan and controllable means for directing the discharge from said grain-bottom at will onto the cleaning-screen or into the casing of the delivery-screw.

37. In a grain-separator, a reciprocatory grain-pan having a grain-bottom and a separating-bottom extending in rear of the grain-bottom, a shoe having pivotal connection with said grain-pan, additional supporting means for the tail end of said shoe, a cleaning-screen in the said shoe, a delivery-screw disposed in a casing underneath the discharge end of the grain-bottom, and means whereby the discharge from the grain-bottom may be directed at the will of the operator onto the cleaning-screen or into the casing of the delivery-screw.

38. In a grain-separator, a reciprocatory grain-pan having a grain-bottom and a separating-bottom extending in rear of the grain-bottom, a shoe having pivotal connection with said grain-pan, a cleaning-screen in said shoe, a delivery-screw disposed in a casing underneath the discharge end of the grain-bottom, means for directing the discharge from the grain-bottom at the will of the operator onto the cleaning-screen, or into the casing of the delivery-screw, and a double screw disposed in a casing beneath the discharge end of the separating-bottom of the grain-pan and delivering the discharge from said separating-bottom in opposite directions through the walls of the casing of the machine.

39. In a grain-separator, the machine-casing, bur-casings having flanges extending through openings in the walls of the machine-casing, a right and left screw, a casing for said screw supported on and connected with the flanges of the bur-casings, and auxiliary concentric openings in the walls of the machine-casing to permit the return of material from the bur-casings, peripherally of the burs, into the machine-casing.

40. In a grain-separator, grinding means for operating upon threshed material to which grain still adheres, said grinding means comprising stationary burs, revoluble housings, burs connected yieldably with said housings, springs interposed between the edges of said burs and the housings, and connecting means including lugs upon the movable burs, loosely engaging openings in the housings, whereby said burs are tiltingly connected with the housings.

41. In a grain-separator, grinding means for operating upon threshed material to which grain still adheres, said grinding means comprising stationary burs, revoluble housings, burs connected yieldably and tiltingly with said revoluble housings and coöperating with the stationary burs, and obliquely-disposed blades mounted upon the sides of the revoluble housings and operating to expel from the bur-casings the material which has been operated upon by the burs.

42. In a grain-separator, grinding means for operating upon threshed material to which grain still adheres, said grinding means comprising stationary burs, revoluble housings, burs connected yieldably and tiltingly with said revoluble housings and coöperating with the stationary burs, means for feeding the threshed, partly-separated material to the eyes of the burs, and means upon the stationary burs and revoluble housings for expelling said material, after being operated upon by the burs and for directing and deflecting it to one of several points for recleaning.

43. In a grain-separator, grinding means for operating upon threshed material to which grain still adheres, said grinding means comprising stationary burs having flanges extending through openings in the walls of the machine-casing, revoluble burs coöperating with said stationary burs, casings inclosing said burs, a screw-casing supported upon and connected with the flanges of the stationary burs, a right and left screw in said casing to receive threshed and partly-separated material and deliver the same to the burs, auxiliary openings in the machine-casing disposed peripherally of the burs and concentric therewith, and means connected with said burs for transmitting the material operated upon by the burs through said openings into the casing of the machine.

44. In a grain-separator, grinding means for operating upon threshed material to which grain still adheres, said grinding means being disposed in casings on the outer sides of the walls of the machine, means for feeding the threshed and partly-separated material to said grinding means, means for returning the material after being operated upon by the grinding means to the interior of the casing of the machine, a chaffing-screen and a cleaning-screen within the latter, and means for deflecting the material returned from the grinding mechanism into the machine-casing upon the chaffing-screen or the cleaning-screen at the will of the operator.

45. In a grain-separator having exteriorly-disposed grinding means for operating upon threshed material to which grain still adheres, and openings through which such material after being operated upon by the grinding means is returned into the casing of the machine, a transverse casing partly inclosing said return-openings, a transverse deflecting-board, and a hinged deflecting-board having a flange adapted to engage the said transverse deflecting-board and to coöperate therewith to direct the discharge from the return-openings in a different direction from the opposite side of the hinged deflecting-board to that bearing the flange, and means, accessible from the outside of the casing, for manipulating said hinged deflecting-board.

46. In a grain-separator having exteriorly-disposed grinding means and openings through which material operated upon by said grinding means may be restored to the interior of the casing, a transverse casing partially inclosing said openings and adjustable deflecting means coöperating with said casing to deflect the discharge from the grinding means in the desired direction within the casing of the separator.

47. In a grain-separator having means exterior of the casing for rethreshing threshed and partly-separated material, a reciprocatory grain-pan having a screen top, means for conveying material discharged over said screen top to the rethreshing means, a chaffing-screen disposed to receive the material discharged from the rethreshing mechanism, a tailings-receptacle, and means for conveying material from the latter to the screen top of the reciprocatory grain-pan.

48. In a grain-separator having means exterior of the casing for rethreshing threshed and partly-separated material, a reciprocatory grain-pan having a screen top, means for conveying material discharged over said screen top to the rethreshing mechanism, a chaffing-screen disposed to receive the material discharged from the rethreshing mechanism, means for creating suction within a prescribed portion of the casing, and fingers extending from the chaffing-screen rearwardly into the path of the suction.

49. In a screen-separator having means exterior of the casing for rethreshing threshed and partly-separated material, a reciprocatory grain-pan having a screen top, means for conveying material discharged over said screen top to the rethreshing mechanism, a chaffing-screen disposed to receive the material discharged from the rethreshing mechanism, means for creating suction within a prescribed portion of the casing, fingers extending from the chaffing-screen rearwardly into the path of suction, a tailings-receptacle disposed below the fingers of the chaffing-screen, and means for conveying material from said tailings-receptacle to the screen top of the grain-pan.

50. In a grain-separator, a reciprocatory grain-pan, supporting means connecting the rear end of said pan with the bottom of the casing, a pair of shoes supported from the under side of said grain-pan and by the supporting means so as to operate in unison with the grain-pan, but the lower shoe having a shorter stroke than the upper one, supporting means for the tail ends of said shoes, a separating-screen mounted adjustably in the upper shoe, a cheat-screen supported in the lower shoe, and a delivery-screw disposed to receive the discharge from the cheat-screen.

51. In a grain-separator, a reciprocatory grain-pan having a separating-screen, grinding means for operating upon threshed and partly-separated material discharged from said screen, means for cleaning and separating the discharge from the grinding means, said means including a chaffing-screen, means for creating suction within a prescribed portion of the machine-casing, fingers extending from the chaffing-screen into the path of suction, a tailings-screw disposed in the path of suction below the fingers of the chaffing-screen, and elevating means to receive the discharge from the tailings-screw and convey the same to the separating-screen of the grain-pan at a point not effected by the suction.

52. In a grain-separator, the combination with the tailings-screw, of an elevator and a hinged door forming a discharge-valve at the upper end of the elevator-casing.

53. In a grain-separator, the combination with a tailings-screw, of an elevator receiving the discharge from the same, a hinged door forming a discharge-valve at the upper end of the elevator-casing, a weight arranged to balance said valve and to keep it normally in a closed position, and friction means to assist in keeping said valve normally closed.

54. In a grain-separator, a fan-casing disposed horizontally under the floor of the casing of the machine, a suction-duct connecting the central portion of the bottom of said casing with the tail end of the machine, and a suction-fan mounted upon a vertical shaft in said casing.

55. In a grain-separator, a fan-casing disposed horizontally under the floor of the casing of the machine, a duct connecting the central portion of the bottom of said casing with the tail end of the machine, a vertical shaft having bearings within the casing, one of said bearings being connected with the bottom on the inlet-duct, a suction-fan mounted upon said shaft, inclined braces connecting the leaves of said fan with an auxiliary hub upon the fan-shaft, and an eduction-spout connecting the side of the fan-casing with the discharge-spout.

56. In a grain-separator, a fan-casing disposed horizontally below the floor of the machine, a duct connecting the central portion of the bottom of said casing with the tail end of the machine, a fan-shaft having bearings in the fan-casing and in the bottom of the duct, a spider bearing against the lower end of the fan-shaft and a truss supporting said spider.

57. In a grain-separator, a fan-casing disposed horizontally under the floor of the casing of the machine, a duct connecting the central portion of the bottom of said fan-casing with the tail end of the machine, a vertical shaft having bearings within the casing, one of said bearings being connected with the bottom of the inlet-duct, a flanged disk connected with the upper bearing and supported upon the top of the fan-casing, a bevel-gear mounted upon the fan-shaft and supported in said flanged disk, lubricating means extending through the latter to the bearing of the fan-shaft and means for transmitting motion to the latter from the shaft of the threshing-cylinder.

58. In a grain-separator having a suction-fan, air-inlet valves, normally open and adapted to be gradually closed by a pressure of air impinging thereon, in combination with a relief-valve normally closed and adapted to be gradually opened by the increase of pressure on the valve.

59. In a grain-separator, a casing normally closed at its rear end, grain-separating mechanism disposed in the rear end of said casing, valved air-inlets disposed in front of said separating mechanism, said valves being normally open to the admission of air, means for setting up a suction in the rear end of the casing, whereby the valves controlling the air-inlets will be gradually closed by the relative increase of pressure on them, and an inwardly-opening relief-valve so located as to permit the passage of air to the suction means without interfering with the separating means.

60. In a grain-separator having a suction-fan, means operated by the suction of said fan for gradually obstructing the admission of air by the increasing speed of the fan, and means for preventing the sudden restoration of said obstructing means to normal, open position in the event of the speed of the fan being suddenly checked, and a relief-valve normally closed and adapted to gradually open for the admission of air by the increasing speed of the fan.

61. In a grain-separator having a suction-fan, separately-disposed means for obstructing the admission of air into the interior of the casing, screens and separating devices disposed in the paths of suction through the separate obstructing means, a duct connecting the tail end of the machine with the central part of the bottom of the fan-casing and a blast or exit spout connecting the side of the latter with a discharge-spout.

62. In a grain-separator having a suction-fan, an eduction-spout connecting the casing of said fan with the elbow of the discharge-spout, a plurality of curved downwardly and forwardly tapered grate-bars disposed at the upper end of said eduction-spout, and a duct connecting the grated section of the latter with the casing of the tailings-screw.

63. In a grain-separator having a suction-fan, an eduction-spout connecting the casing of said fan with the elbow of the discharge-spout, a plurality of curved, downwardly and forwardly tapered grate-bars having laterally-extending flanges secured in the interior of said eduction-spout at its upper end, and a duct connecting said grated upper end with the casing of the tailings-screw.

64. In a grain-separator, a grain-pan having a separating-screen and a grain-bottom, in combination with longitudinal strips spacing said screen from said grain-bottom, additional strips mounted upon the upper side of the screen, and connecting means for said strips, said strips coacting to form longitudinal divisions in the grain-pan.

65. In a grain-separator, a grain-pan comprising a grain-bottom and a corrugated separating-screen, in combination with longitudinal dividing-strips engaging the upper and under sides of said screen, and connecting means for said strips whereby the corrugations of the screen are crushed at the points of contact with said strips.

66. In a grain-separator, a longitudinally-disposed system of grain-separating devices, a straw-rack disposed above said separating devices, a suction-fan disposed under the casing of the machine, an air-duct connecting the casing of said fan with the tail end of the machine, and air-inlet valves disposed in front of the separating-screens and adapted to be actuated by the pressure of incoming air to obstruct the passage thereof.

67. In a grain-separator, a system of longitudinally-disposed grain-separating devices, a straw-rack disposed above said separating devices, a suction-fan disposed under the casing of the machine, an air-duct connecting the fan-casing with the tail end of the machine, air-inlet valves disposed in front of the separating mechanism and adapted to close under the pressure of incoming air and an air-inlet valve disposed above the straw-rack near the tail end of the latter and adapted to open under the pressure of incoming air.

68. In a grain-separator, a system of longitudinally-disposed grain-separating devices, a straw-rack disposed above said separating devices, a suction-fan disposed under the casing of the machine, a duct connecting the casing of the fan with the tail end of the machine, air-inlet valves disposed in front of the separating-screens and adapted to be actuated by the pressure of incoming air to obstruct the passage thereof, and a relief-valve disposed above the tail end of the straw-rack, said relief-valve being normally closed, but adapted to open under the pressure of incoming air.

69. In a grain-separator, a longitudinally-disposed system of grain-separating devices, a straw-rack disposed above said separating devices, a suction-fan, a duct connecting the casing of said fan with the tail end of the machine, an air-inlet valve disposed above the tail end of the straw-rack and adapted to open under the pressure of incoming air, a fall-board hingedly mounted under the deck of the machine-casing in front of said air-inlet valve and adapted for the passage under it of straw passing over the straw-rack in the direction of the tail end of the machine and air-inlet valves disposed in front of the separating-screens and adapted to be actuated by the pressure of incoming air to assist the passage thereof.

In testimony that I claim the foregoing as my own I have hereto affixed my signature in the presence of two witnesses.

GRAN W. HILL.

Witnesses:
EDWARD L. ALDRICH,
O. F. HINKLEY,